United States Patent
Laroia et al.

(10) Patent No.: US 8,712,448 B2
(45) Date of Patent: *Apr. 29, 2014

(54) EFFICIENT PAGING IN A WIRELESS COMMUNICATION SYSTEM

(75) Inventors: Rajiv Laroia, Far Hills, NJ (US); Junyi Li, Chester, NJ (US); Sundeep Rangan, Jersey City, NJ (US); Prashanth Hande, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 12/751,961

(22) Filed: Mar. 31, 2010

(65) Prior Publication Data

US 2010/0190514 A1 Jul. 29, 2010

Related U.S. Application Data

(63) Continuation of application No. 10/865,616, filed on Jun. 10, 2004, now Pat. No. 7,711,337.

(51) Int. Cl.
*H04W 68/00* (2009.01)

(52) U.S. Cl.
USPC ........ 455/458; 455/426.1; 455/343; 455/434; 455/574; 455/575; 370/312; 370/332; 370/335; 370/210

(58) Field of Classification Search
USPC ........ 455/458, 426.1, 343; 370/483, 342, 316
See application file for complete search history.

(56) References Cited

U.S. PATENT DOCUMENTS

| | | | |
|---|---|---|---|
| 4,961,073 A | 10/1990 | Drapac et al. | |
| 5,146,214 A | 9/1992 | Yamada et al. | |
| 5,604,744 A | 2/1997 | Andersson et al. | |
| 5,905,965 A | 5/1999 | Asano et al. | |

(Continued)

FOREIGN PATENT DOCUMENTS

| CN | 1284795 | 2/2001 |
|---|---|---|
| DE | 19931130 A1 | 1/2001 |

(Continued)

OTHER PUBLICATIONS

Australian Search Report, SG200608533-6—Australian Patent Office, Feb. 13, 2008.

(Continued)

*Primary Examiner* — Kiet Doan
*Assistant Examiner* — Michael T Vu
(74) *Attorney, Agent, or Firm* — Larry J. Moskowitz

(57) ABSTRACT

Methods and apparatus for efficient two-stage paging wireless communications systems are described. Wireless terminals are assigned to paging groups. A few first paging message information bits are modulated (using non-coherent modulation) into a first paging signal and communicated from a base station to wireless terminals. WTs wake-up, receive the first paging signal and quickly ascertain whether its paging group should expect a second paging signal, if so, the WT is operated to receive the second paging signal; otherwise, the WT goes back to sleep conserving power. The base station modulates (using coherent modulation) a number of second message information bits into a second paging signal and transmits the signal to WTs. From the information in first and second paging signals, a WT can determine that it is the paged WT and process the paging instructions. The intended paged WT can transmit an acknowledgement signal on a dedicated uplink resource.

20 Claims, 13 Drawing Sheets

(56) References Cited

U.S. PATENT DOCUMENTS

| | | | |
|---|---|---|---|
| 5,991,635 A | 11/1999 | Dent et al. | |
| 6,009,327 A | 12/1999 | Park | |
| 6,029,061 A | 2/2000 | Kohlschmidt | |
| 6,058,289 A | 5/2000 | Gardner et al. | |
| 6,091,960 A | 7/2000 | Raith et al. | |
| 6,128,776 A | 10/2000 | Kang | |
| 6,393,295 B1 | 5/2002 | Butler et al. | |
| 6,421,540 B1 | 7/2002 | Gilhousen et al. | |
| 6,477,382 B1 * | 11/2002 | Mansfield et al. | 455/458 |
| 6,687,285 B1 | 2/2004 | Jou | |
| 6,771,958 B1 * | 8/2004 | Koo et al. | 455/426.1 |
| 6,816,736 B2 | 11/2004 | Laroia et al. | |
| 6,876,672 B1 * | 4/2005 | Castelain | 370/483 |
| 7,158,502 B2 | 1/2007 | Harris et al. | |
| 7,428,420 B2 | 9/2008 | Lee | |
| 7,711,377 B2 | 5/2010 | Laroia et al. | |
| 7,796,631 B2 | 9/2010 | Sinnarajah et al. | |
| 2002/0142785 A1 | 10/2002 | Park et al. | |
| 2003/0058820 A1 | 3/2003 | Spencer et al. | |
| 2003/0063579 A1 | 4/2003 | Lee | |
| 2003/0076871 A1 | 4/2003 | Abrishamkar et al. | |
| 2003/0114107 A1 | 6/2003 | Aoyagi | |
| 2003/0114132 A1 | 6/2003 | Yue | |
| 2004/0240379 A1 | 12/2004 | Tsuie | |
| 2005/0030914 A1 | 2/2005 | Binzel et al. | |
| 2010/0178942 A1 | 7/2010 | Laroia et al. | |

FOREIGN PATENT DOCUMENTS

| | | |
|---|---|---|
| EP | 0610025 A1 | 8/1994 |
| EP | 0936747 A2 | 8/1999 |
| FR | 2799597 A1 | 4/2001 |
| JP | 2002223470 | 8/2002 |
| JP | 2002525903 | 8/2002 |
| JP | 2003092780 | 3/2003 |
| JP | 2003524993 | 8/2003 |
| JP | 2005528864 | 9/2005 |
| WO | WO 9749194 A1 | 12/1997 |
| WO | WO 0016491 | 3/2000 |
| WO | WO 0052948 A1 | 9/2000 |
| WO | WO 0163808 A1 | 8/2001 |
| WO | WO 03007636 | 1/2003 |
| WO | WO 03103333 | 12/2003 |

OTHER PUBLICATIONS

"Basic Modulation/demodulation system", Sasase, lwao. Keio University, Japan. http://www.sasase.ics.keio.ac.jp/jugyo/kihon.pdf. Publication date unknown.

International Search Report and Written Opinion—PCT/US2005/020257, International Search Authority—European Patent Office—Oct. 31, 2007 (060586).

Ishikawa, et al., "A study on Multi-tone Combinatory Fast Frequency Hopping/MFSK System" Technical Report of IEICE. The Institute of Electronics, Information and Communication Engineers, Japan, Jul. 24, 1998, vol. 98, No. 214, pp. 61-66, CS98-63.

3GPP TS 25.213 V5.5.0: 3rd Generation Partnership Project; Technical Specification Group Radio Access Network; Spreading and modulation (FDD) (Release 5), 3GPP Standard; Valbonne, France; (Dec. 1, 2003), pp. 1-28, XP050366804.

ETSI TS 125 211 V6.1.0: Universal Mobile Telecommunications System (UMTS); Physical channels and mapping of transport channels onto physical channels (FDD) (3GPP TS 25.211 version 6.1.0 Release 6); ETSI Standards, Sophia Antipolis Cedex, France, (Jun. 1, 2004)XP014016683, ISSN: 0000-0001.

QUALCOMM: "MBMS PICH," R2-040034, 3GPP Draft; 3GPPP TSG-RAN WG2 meeting #40, 3rd Generation Partnership Project (3GPP), Sophia-Antipolis, France. (Jan. 19, 2004), XP050125052, [retrieved on 2004-01-191].

Supplementary European Search Report—EP05758002, Search Authority—The Hague Patent Office, Dec. 22, 2010.

European Search Report—EP13020013—Search Authority—The Hague—Aug. 7, 2013.

* cited by examiner

FIGURE 11 (1100)

EFFICIENT PAGING IN A WIRELESS COMMUNICATION SYSTEM

CLAIM OF PRIORITY UNDER 35 U.S.C. §120

The present application for patent is a Continuation of patent application Ser. No. 10/865,616 entitled "EFFICIENT PAGING IN A WIRELESS COMMUNICATION SYSTEM" filed Jun. 10, 2004, pending, and assigned to the assignee hereof and hereby expressly incorporated by reference herein in its entirety.

FIELD OF THE INVENTION

The present invention relates generally to the field of paging in a wireless communications system and more specifically to improved methods and apparatus for efficient two-stage paging.

BACKGROUND

In a wireless communication system, the notions of sleep state and paging are important to provide network connectivity to a large population of wireless devices, e.g., wireless terminals, in a battery power efficient and air link resource efficient manner. Wireless terminals may be implemented as various mobile devices.

Sleep state provides a wireless terminal with a mode of operation to minimize battery power consumption by shutting down the whole or part of the terminals transmit/receive circuitry. In addition, in some systems, a wireless terminal in the sleep state is not allocated any dedicated air link resource and therefore a large number of users can be simultaneously supported. During time intervals where the wireless terminal has no traffic activity, the wireless terminal can stay in the sleep state thus conserving resources.

Paging involves waking up the wireless terminal periodically from the sleep state and operating the wireless terminal to receive and process paging messages (if transmitted) in a downlink, e.g., in communications from a base station to the wireless terminal. The base station usually knows when the wireless terminal should wake up. Thus, if the base station intends to contact, or page, the wireless terminal, the base station can send a paging message in a downlink paging (DLPG) channel at the time when the wireless terminal will wake up and monitor the channel. If the wireless terminal does not receive any message for it in the DLPG channel, the wireless terminal can go back to the sleep state. Otherwise, the wireless terminal should carry out any operations specified in the paging message. For example, a wireless terminal may just receive the messages and go back to the sleep state. Alternatively, the wireless terminal may access the base station to establish active connection with the base station.

The time interval between two successive wake-up periods is called a paging cycle. It is during the portion of the paging cycle when a wireless terminal is not doing processing related to receiving a page that a wireless terminal can operate in a sleep state. In order to maximize the benefit of the sleep state, known paging systems generally use a large value for the paging cycle. For example, in a voice system, e.g., IS-95, the typical paging cycle is about 1 to 3 seconds. In data systems, the paging cycle can be even larger. For example, in 1xEV DO, the typical paging cycle is about 5 seconds. In known systems, when the wireless terminal wakes up, in order to receive the DLPG channel, the wireless terminal usually needs to carry out certain physical layer operations, such as synchronizing the receiver with the downlink signal and training the channel estimation for the downlink channel. In addition, the DLPG channel transmission generally occupies a relatively long time period and typically contains short instructional messages as well as identification information. For example, a paging message transmission in the IS-95 system may occupy 80 milli-seconds. Hence, when the wireless terminal wakes up, it generally consumes quite amount of battery power to complete all the required operations with the device operating for, e.g., 80 milli-seconds or more at full power during each period in which a page may be received. This known paging method is well suited for establishing end-to-end set-up for conventional communications services such as voice channels which may have a relatively long duration and can support a fair amount of delay, e.g., several seconds, between paging periods.

However, a large paging cycle (which conserves power) results in a large paging latency, which is not suitable for various emerging services, such as push-to-talk. These emerging services may require a very small paging latency, e.g., cycles well under a second, to give a user a sense of an immediate response. For example, in a push-to-talk system, to minimize the call set-up time, the desired paging cycle may be about 100 milli-seconds, which is much shorter than what many known paging system can support. Note that the with known paging systems such as that used in IS-95 it is unlikely that these systems will be able to simply reduce the paging cycle dramatically to meet such a requirement. This is because of the large amount of battery power consumption required in each wake-up period in the known paging systems due, in part, to the channel estimation process. In such systems if a small paging cycle were used, the amount of power consumed due to the frequent wake-up operations would result in a user having to recharge the device's battery very frequently, which is unpractical. Therefore, there is a need for an efficient paging system that can meet the low paging latency requirements of these new emerging services. It would be highly desirable if low paging latency could be achieved without significantly increasing the overall battery power consumption rate as compared to existing devices.

Based upon the above discussion, it is clear that improved methods of paging are needed which increase the paging efficiency of the wireless communications system in order to meet the low paging latency requirements of new emerging services, such as push-to-talk and/or to reduce the rate of battery power consumption with existing services. New paging methods that reduce battery power consumption of wireless terminals facilitate opportunities for repeat pages of failed paging attempts, and/or limit system interference due to paging signaling would be beneficial. Paging improvements developed to meet the requirements of new emerging services could also be beneficially used in existing conventional services system applications to increase overall efficiency and conserve resources and need not be limited to applications which require or use low latency paging.

SUMMARY OF THE INVENTION

Figure 1:
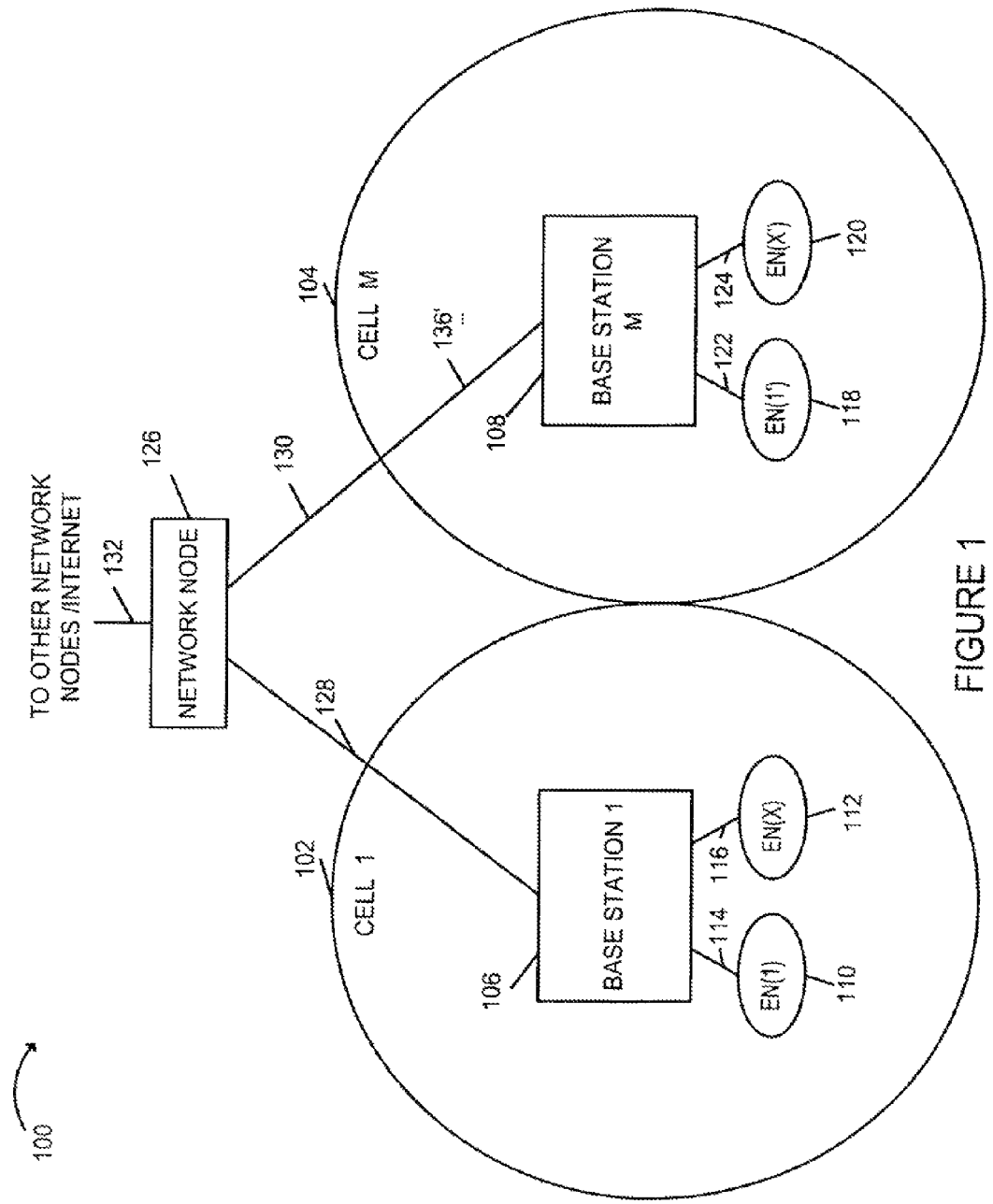
FIG. 1 illustrates an exemplary wireless communications system that may use the paging methods of the present invention.

The present invention is directed to paging methods and apparatus. The methods and apparatus of the present invention can be used to reduce wireless terminal, e.g., mobile device, power consumption requirements associated with paging, as compared to known paging techniques.

In accordance with the present invention, pages are sent using multiple signals. A first paging signal is used to indicate whether a paging message is being transmitted, e.g., to a particular wireless terminal or a group of wireless terminals. When the first paging signal indicates that a paging message is being transmitted, at least one additional paging signal, e.g., a second paging signal, is transmitted. In most cases, the second paging signal is transmitted following the first paging signal, e.g., at a fixed time offset from the first paging signal.

To allow a wireless terminal to determine if a page is being transmitted to the wireless terminal or to a device within a group to which a particular wireless terminal belongs, without having to perform channel estimation operations, in various embodiments, the first paging signal is transmitted using a type of modulation which does not require channel estimate information for decoding. The second paging message is normally transmitted using a different type of modulation than the first type of modulation, e.g., a modulation method which uses channel estimation information in the demodulation process.

In some embodiments, the first paging signal is transmitted using a non-coherent type of modulation such as on/off modulation, orthogonal modulation, and differential modulation. In such embodiments, the second paging signal is transmitted using coherent modulation. Examples of coherent modulation include quadrature phase shift keying and quadrature amplitude modulation. Non-coherent modulation techniques do not require channel information for decoding of the modulated signals. Accordingly, non-coherent modulated signals can usually be decoded quickly without having to take the time to obtain and/or use channel information in the decoding process. Coherent modulation techniques use channel information for decoding of the modulated signals. Accordingly, while often supporting higher coding rates than non-coherent modulation techniques, coherent modulation may require a device to spend time acquiring accurate channel estimates and/or other channel information before the device can reliably decode the coherently modulated signals.

In some, but not necessarily all embodiments, the first paging signal includes fewer information bits than the second paging signal. The first paging signal may be transmitted at predetermined, e.g., periodic times, and have a known relationship to a particular wireless terminal or group of wireless terminals. In this manner, by waking up at the predetermined time, a mobile can receive and decode a first paging signal. If the first paging signal indicates that a paging message has been transmitted, e.g., in a second paging signal or using multiple additional paging signals, the mobile device remains awake and generates the necessary channel information which can be used to decode the second paging signal which includes all or a portion of a paging message.

In the case where first paging signals indicate transmission of a page to at least one device in a group of wireless terminals, the second paging signal includes sufficient information, alone or when taken in combination with information in the first paging signal, to determine which particular wireless terminal in the group to which the first paging signal corresponds, the transmitted paging message is intended for. In some embodiments the second paging signal includes all or a portion of a wireless terminal identifier used to identify the wireless terminal with a sector, cell or system into which the particular second paging signal is transmitted.

Paging signals, e.g., first and second paging signals, may be periodically transmitted, e.g., according to a fixed known predetermined schedule. In the case where a particular first paging signal indicates that no paging message is being transmitted, the second paging signal transmission slot associated with the particular first paging signal may go unused.

More than one paging signal modulated with a coherent modulation method may be associated with a first paging signal modulated using a non-coherent modulation method. Such an embodiment is particularly well suited for implementations where multiple wireless terminals, e.g., a group of terminals, is associated with a particular first paging signal.

Different embodiments may have different types of paging cycles and/or paging intervals.

The methods and apparatus of the invention can be used with numerous different types of communications systems including CDMA and OFDM systems.

Numerous additional features, advantages and embodiments of the methods and apparatus of the present invention are described in the detailed description which follows.

DETAILED DESCRIPTION

FIG. 1 illustrates an exemplary wireless communications system 100 implemented in accordance with the present invention. Exemplary wireless communications system 100 is a spread spectrum OFDM (orthogonal frequency division multiplexing) multiple-access system. While an exemplary OFDM wireless communications system is used in this application for purposes of explaining the invention, the invention is broader in scope than the example, and the invention can be applied in many other communication systems, e.g. a CDMA wireless communications system, as well where paging is employed.

System 100 includes a plurality of cells: cell 1 102, cell M 104. Each cell (cell 1 102, cell M 104) includes a base station (BS), (BS 1 106, BS M 108), respectively, and represents the wireless coverage area of the base station. BS 1 106 is coupled to a plurality of end nodes, (EN(1) 110, EN(X) 112) via wireless links (114, 116), respectively. BS M 108 is coupled to a plurality of end nodes, (EN(1') 118, EN(X') 120) via wireless links (122, 124), respectively. The end nodes 110, 112, 118, 120 may be mobile and/or stationary wireless communications devices and are referred to as wireless terminals (WTs). Mobile WTs are sometimes referred to as mobile nodes (MNs). MNs move throughout system 100. BS 1 106 and BS M 108 are coupled to network node 126 via network links 128, 130, respectively. Network node 126 is coupled to other network nodes and the Internet via network link 132. Network links 128, 130, 132 may be, e.g., fiber optic cables.

The paging methods of the present invention may be used in exemplary OFDM wireless communications system 100. Individual base stations (e.g., BS 1 106) transmit paging signal information including first paging signals, using, e.g., non-coherent modulation and second paging signals, e.g., using coherent modulation, to ENs (e.g. EN(1) 110) within the cell (e.g. cell 1 102) in which the BS is located in accordance with the invention. ENs (e.g., EN(1) 110) receive the paging information and may respond, e.g., by sending one or more acknowledgment signals, in accordance with the methods of the present invention.

Figure 2:
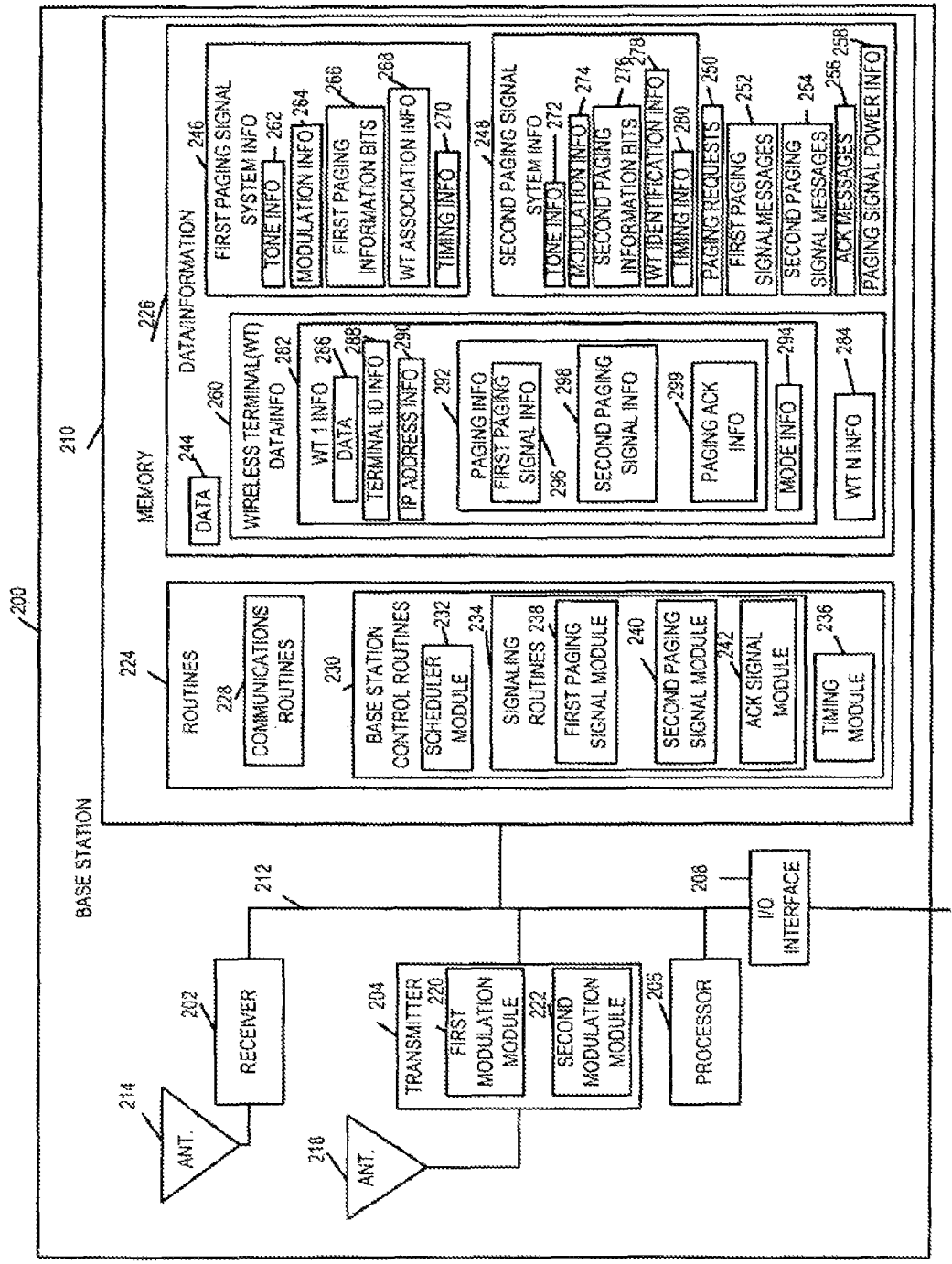
FIG. 2 illustrates an exemplary base station implemented in accordance with the present invention.

FIG. 2 illustrates an exemplary base station 200 implemented in accordance with the present invention. BS 200 is a more detailed representation of a BS 200 which may be used as any one of the BSs 106, 108 of system 100 shown in FIG. 1. Exemplary BS 200 includes a receiver 202, a transmitter 204, a processor 206, an I/O interface 208, and a memory 210 coupled together via bus 212 over which the various elements may interchange data and information. Transmitter 204 includes a first modulation module 220 and a second modulation module 222. Receiver 202 is coupled to an antenna 214 through which the BS 200 receives signals from wireless terminals 300 (see FIG. 3). The received signals may include, e.g., acknowledgement message signals that are transmitted by WTs in response to paging messages. Transmitter 204 is coupled to an antenna 218 over which BS 200 may transmit information including paging message signals to a plurality of WTs 300. I/O interface 208 provides an interface from BS 200 to the Internet and to other network nodes.

Memory 210 includes routines 224 and data/information 226. Processor 206, e.g. a CPU, executes the routines 224 and uses the data/information 226 in memory 210 to control BS 200 and to perform routine base station operations, e.g., scheduling of air link resources to users, control of downlink traffic channel tone hopping sequences, transmitter 204 power control for downlink traffic channels, etc., and implement the paging methods of the present invention. Routines 224 include communications routines 228 and base station control routines 230. The base station control routines 230 include a scheduler module 232, a signaling routine 234, and a timing module 236. Signaling routine 234 includes a first paging signal module 238, a second paging signal module 240, and an acknowledgement signal module 242.

Data information 226 includes data 244, first paging signal system information 246, second paging signal system information 248, paging requests 250, first paging signal messages 252, second paging signal messages 254, acknowledgment messages 256, paging signal power information 258, and wireless terminal data/information 260. Data 244 may include data (e.g., user data from a communications session with a peer node) to be transmitted to WTs 300 and/or data received from WTs 300.

Wireless Terminal (WT) Data/Information 260 includes WT data/information for each of a plurality of wireless terminals 1 . . . N, e.g., WT 1 information 282, WT N information 284. WT 1 info 282 includes data 286, terminal identification (ID) information 288, Internet Protocol (IP) address information 290, paging information 292 and mode information 294. Data 252 may include data received by BS 200 intended to be forwarded to WT 1 and data received from WT 1 intended for a peer node of WT 1, e.g. WT N. Terminal ID info 288 may be a base station assigned ID for WT 1. IP address info 290 may be an identifier unique to the WT 1 300 and may be base station independent. Paging info 292 includes first paging signal information 296, second paging signal information 298, and paging acknowledgement information 299. First paging signal information 296 may include information defining and/or included in first paging signal messages 252 intended for WT 1, including a group ID corresponding to a group of which WT 1 is a member. Second paging signal information 298 may include information defining and/or included in second paging signal messages 254 intended for WT 1 including information to uniquely identify WT 1, timing information as to when to transmit the second paging message for WT 1, power level of transmission and additional paging information such as the type of page. Paging acknowledgement information 299 may include information indicating whether or not an acknowledgment message 256 from WT 1 has been received in response to a second paging signal message 254 sent from BS 200. Mode information 294 may specify the state of WT 1 (e.g., ON state, sleep state, etc.)

First paging signal system information 246 includes tone information 262, modulation information 264, first paging information bits 266, WT association information 268, and timing information 270. Tone information 268 defines the tones to be used in the first paging signals. Tone information 268 may also define subsets of the tones. In some embodiments, each tone subset may include contiguous physical tones, and a first paging signal is transmitted with transmission power applied to one subset of tones while no transmission power is applied to the other subsets of tones. By using a subset of contiguous tones including a few tones, assuming that the channel doesn't vary too much between the tones of the subset, it may be possible to recover data on the tones without performing a channel estimate in some cases where non-coherent modulation is used. The modulation information 264 may include information used by the first paging signal module 238 to control operation of the first modulation module 220 to implement a selected non-coherent modulation scheme(s) to modulate the information of the first paging signal messages 252 and transmit the first paging signals, in accordance with the present invention. Exemplary non-coherent modulation schemes may include on/off modulation, orthogonal modulation, and differential modulation. The non-coherent modulation schemes implemented may use code words and may utilize phase information as well as amplitude information depending on the non-coherent modulation method that is used. First paging information bits 266 include the information bits in a first paging signal message 252. First page information bits 266 may include group identification (ID) bits and extension bits. Group ID bits may include a number of bits in a first paging signal message 252 which may be modulated to convey which specific group, if any, has a member that is being paged by the first paging signal message 252. Extension bits may include bits which may be set in a first paging signal message 252 to indicate that WTs within a group with a page should look for a second paging signal message 254 at a time usually associated with a different group. Extension bits may be used where multiple WTs within a single group need to be paged at the same time, and the normally used second paging signal message 254, at the predetermined time, does not have sufficient capacity to carry the information. WT association information 268 includes information enabling BS 200 to associate each individual WT that may receive pages (e.g., a WT with a unique IP address 290) with a group identified by the group ID bits. Timing information 270 includes information defining when to transmit first paging signal messages 252 to WTs. For example, timing information 270 may define the specific OFDM symbol period(s) within the super slot for first paging message signal transmissions, a paging interval segment (e.g., repeat interval between successive first paging signals), a paging interval (e.g., a repeat interval between two successive wake-up periods for a paging group) and/or beacon slots used for transmission timing control of first paging signals. Because the WT battery power consumption in each wake-up period is very little, in the current invention, the paging system can employ a relatively small paging cycle, e.g. around 100 milli-seconds, to reduce paging latency, while keeping the overall battery power consumption of WTs low.

Second paging signal system information 248 includes tone information 272, modulation information 274, second paging information bits 276, WT identification information 278, and timing information 280. Tone information 282 may include a set of tones defined to be used for transmission of the second paging messages. In some embodiments, the tones used may follow a hopping sequence. Modulation information 274 may include information used in a coherent modulation scheme (e.g., Quadrature Phase Shift Keying QPSK or Quadrature Amplitude Modulation (QAM)) used by the second paging signal module 240 to control the operation of the second modulation module 222 to modulate second paging information bits 276 of a second paging message 254 into a second paging signal. Second paging information bits 276 may include bits used for paging identification and bits used to convey additional information such as information providing specific paging instructions to the paged WT 300. Examples of instructions that may be communicated by the second paging message include transition to an on state, receive timing control information, send timing control information, send power control information, send status information, etc. Second paging information bits 276 include a greater number of bits than first paging information bits 266, in accordance with the invention. WT identification information 278 may include information allowing the WT 300 receiving the second paging information to identify that WT 300 is the specific intended recipient for a second paging signal message 254. In some embodiments, the WT identification information 278 includes a full WT identifier sufficient to uniquely identify the intended recipient with the cell. In some embodiments, the identification information 278 includes enough bits to convey a full IP address (e.g., IP address information for WT1 290). In other embodiments, the WT identification information 278 may include a partial identifier, such that when the information from the identification bits from the second paging message 254 are combined with the information conveyed by the group identification bits of the first paging signal message 252, the full IP address, of the intended recipient of the second paging message 254, may be determined. Timing information 280 may include information such as when to transmit the second paging messages to the WTs. For example, different groups may be assigned different OFDM symbol times within the super slot, paging interval segment, paging interval, and/or beacon slot in which the BS 200 is to transmit second paging messages 254 signals. Each group may be assigned a few consecutive OFDM symbol times within a paging interval for its second paging signal messages 254 signals. Paging requests 250 include requests for pages to specific wireless terminals generated by BS 200 or received by BS 200 from other elements within the system, e.g., another base station, a AAA (Authentication Accounting and Authorization) server, a peer node, etc. First paging signal messages 252 are messages to be transmitted to WTs 300 conveying first paging information bits 266. First paging signal messages 252 are modulated using a first paging non-coherent modulation scheme, in accordance with the present invention. Second paging signal messages 254 are messages to be transmitted to WTs 300 conveying second paging information bits 276, such messages 254 are modulated using a second paging coherent modulation scheme, in accordance with the present invention. Acknowledgement messages 256 are messages received from WTs 300. Acknowledgement messages 256 are transmitted by WTs 300 to BS 200 in response to the successful reception of a second paging signal message 254 intended for the specific WT 300. The acknowledgement message 256 may be a short message, (e.g. one or a few bits), and is transmitted at a predetermined time (e.g., at a fixed time offset with respect to the second paging signal message.) In some embodiments, the acknowledgement message 256 may be expected to be received by the BS 200 before the designated time for the next potential second paging signal message. This allows for retransmission of the second paging message based on an informed decision, in the event that an acknowledgement is not received and without skipping a paging period. Paging signal power information 258 may include information defining the power level of the first and second paging signals. In some embodiments, the power level of the second paging signal may be varied as a function of the number of unresponded page attempts, type of page, level of service of service, and/or mode 294. For example, the first time a second paging signal message 254 signal is transmitted by BS 200 to WT 300, the power level may be set at a low level. If an acknowledgement 256 is not received, the power level may be increased and the same second paging signal may again be sent to the same WT terminal at a time reserved for second paging messages. In some embodiments, the repeat second paging message 254 (at an increased power level) is sent at the next available second paging time slot. In other embodiments, the repeat second paging message 254 (at an increased power level) is sent at the standard time in the next paging interval reserved for second paging messages 254 intended for the group to which the WT 300 belongs.

Communications routines 228 implement the various communications protocols used by the base station 200. Base station control routines 230 control the functional operation of the base station including operation of the receiver 202, transmitter 204, scheduling of users, power control, timing control, and paging signaling in accordance with the present invention. The base station control routines 230 include a scheduler module 232, signaling routines 234, and a timing module 236. The base station's scheduler module schedules WTs 300 for uplink and downlink air link resources (e.g., bandwidth over time). The signaling routines 234 use the data/information 226 to control the operation of the transmitter 204 to send signals (including first paging signal messages 252 and second paging signal messages 254) to WTs 300 and to operate the receiver 202 to receive signals (including acknowledgement messages 256) from WTs 300. Timing module 236 uses the data/information 226 including first paging signal timing information 270 and second paging signal timing information 280 to control the timing of the transmission of first and second paging messages 252, 254. First paging signal module 238 uses data/information 226 including paging requests 250, first paging signal system information 246 and WT data/information 260 to generate first paging signal messages 252, to control the first modulation module 220 to perform a non-coherent modulation of first paging signal message 252, and control the transmitter 204 to transmit the modulated signal to WTs 300. Second paging signal module 240 uses data/information 226 including paging requests 250, second paging signal system information 248, paging signal power information 258, and WT data/information 260 to generate second paging signal messages 254, to control the second modulation module 222 to perform a coherent modulation of second paging signal message 254, and to control the transmitter 204 to transmit the modulated signal to WTs 300. In some embodiments, the second paging signal module 240 may be activated by paging requests 250, and when no paging requests are being processed, the second paging signal module is not activated. Acknowledgement signal module 242 controls the receiver 202 to process acknowledgment messages 256 received from WTs 300 in response to second paging signal messages 254. Acknowledgment signal module 242 forwards paging acknowledgement messages 256 to paging acknowledgement information 299 of WT data/info 260, which is used, e.g., to determine whether or not a retransmission of a second paging signal message 254 is required, e.g. at a higher signal power level.

Figure 3:
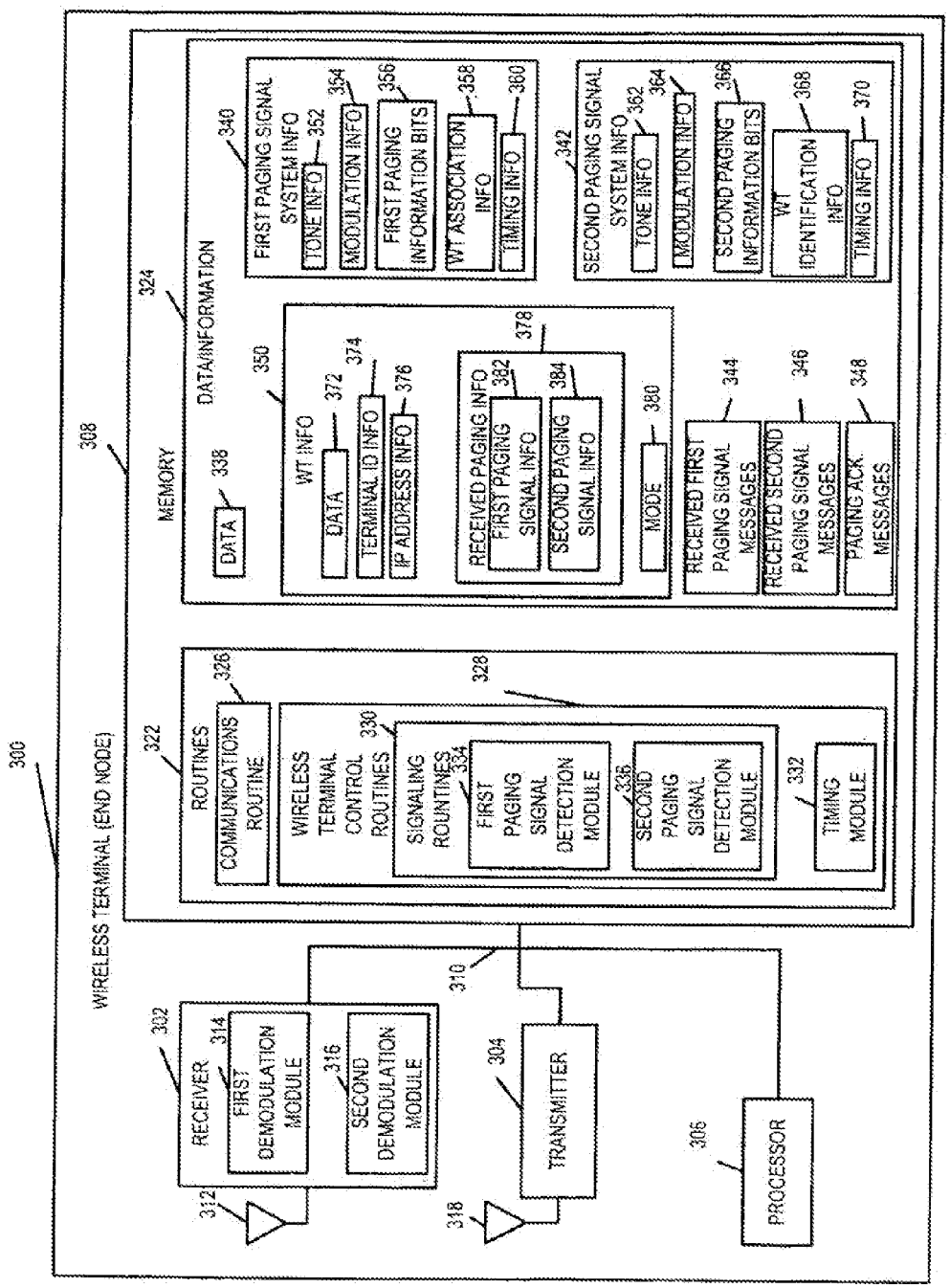
FIG. 3 illustrates an exemplary wireless terminal, implemented in accordance with the invention.

FIG. 3 illustrates an exemplary wireless terminal (end node) 300 implemented in accordance with the present invention. Exemplary WT 300 may be used as any one of the WTs 110, 112, 118, 120 of system 100. Exemplary wireless terminal 300 includes a receiver 302 coupled to an antenna 312, a transmitter 304 coupled to an antenna 318, a processor 306, and a memory 308 which are coupled together via bus 310 over which the various elements can interchange data/information.

Receiver 302 receives downlink signals from BS 200 including first and second paging signals in accordance with the present invention. Receiver 302 includes a first demodulation module 314 and a second demodulation module 316. First demodulation module 314 demodulates the received first paging signals (transmitted from BS 200) according to the non-coherent modulation scheme employed in accordance with the present invention. Second demodulation module 316 demodulates the received second paging signals (transmitted from BS 200) according to the coherent modulation scheme employed in accordance with the present invention.

Transmitter 304 is used to transmit uplink signals to the BS 200. The transmitted uplink signals include acknowledgement signals in response to received paging messages (e.g., with each acknowledgement corresponding to a received second paging signal intended for WT 300).

Memory 308 includes routines 322 and data/information 324. Processor 306, e.g. a CPU, executes the routines 322 and uses the data/information 324 in memory 308 to control WT 300 and to perform routine wireless terminal operations (e.g., receive downlink traffic channel information, transmit uplink traffic channel information, perform WT power control operations, perform WT timing control operations) and implement the paging methods of the present invention. Routines 322 include a communications routine 326 and wireless terminal control routines 328 including signaling routines 330 and a timing module 332. The signaling routines 330 include a first paging signal detection module 334 and a second paging signal detection module 336. Data/information 324 includes data 338, first paging signal system information 340, second paging signal system information 342, received first paging signal messages 344, received second paging signal messages 346, paging acknowledgement messages 348, and WT information 350. Data 338 may include data (e.g., user data intended for a peer node in communications session with WT 300) to be transmitted to BS 200 and data received from BS 200.

First paging signal system information 340 includes tone information 352, modulation information 354, first paging information bits 356, WT association information 358, and timing information 360.

Tone information 352 may define the tones to be used in the signals corresponding to the received first paging signal messages 344. Tone information 352 may also define subsets of the tones. In some embodiments, each tone subset may include contiguous physical tones, and a first paging signal is transmitted by BS 200 with transmission power applied to one subset of tones while no transmission power is applied to the other subsets of tones. When using a subset of contiguous tones, an assumption may be made that the channel doesn't vary too much between the tones of the subset. In such a case it may be possible, depending on the modulation scheme and channel conditions, for the WT 300 to recover the transmitted data included in the received first paging signal message 344 without performing a channel estimate.

The modulation information 354 may include information used by the first paging signal detection module 334 to control the operation of the first demodulation module 314 to use one or more selected non-coherent modulation scheme(s) to process (demodulate) the first paging signal and obtain the information of the received first paging signal message 344, in accordance with the present invention. In performing non-coherent de-modulation WT 300 does not need, and does not, establish a channel estimate or rely on the history of channel conditions in order to demodulate and retrieve the transmitted information. Exemplary non-coherent modulation schemes may include on/off modulation, orthogonal modulation, and differential modulation. The non-coherent modulation schemes implemented may use code words and may utilize phase information and/or amplitude information.

First paging information bits 356 include the information bits in a received first paging signal message 344. First page information bits 356 normally include one or more group ID bits and, optionally, extension bits. Group ID bits indicate which specific group, if any, has a member that is being paged by the received first paging signal message 344. The Group ID bits may be a pre-selected number of bits used at the start of each WT identifier assigned to a WT in the group, e.g., a set of mask bits corresponding to the first n bits of the IP addresses assigned to the WTs in the group. Thus, in such an embodiment, the Group ID bits may be a pre-selected number of bits, where each set of Group ID bits is a unique pattern of a pre-selected number of bits at the start of a WT identifier, e.g., a set of mask bits, where each mask bit corresponds to a unique pattern (relative to the other Group ID bits) of the first n bits of an WT IP address. Extension bits may include bits which may be set in a first paging message to indicate that WTs 300 within a group should look for a second paging message at a time usually associated with a different group. Extension bits may be used where multiple WTs 300 within a single group need to be paged at the same time, and the normally used second paging message, at the predetermined time, does not have sufficient capacity to carry the information.

WT association information 358 includes information associating WT 300 with a group identified by a set of group ID bits. Timing information 360 may include information defining when to look for first paging message signals from BS 200. For example, in some embodiments, timing information 360 defines the specific OFDM symbol period(s) within the super slot for first paging message signal transmissions, a paging interval segment (or repeat interval between successive first paging signal messages 252), paging interval (repeat interval between two successive wake-up periods for a paging group), and/or beacon slots used for transmission timing control of first paging signals.

Second paging signal system information 342 may include tone information 362, modulation information 364, second paging information bits 366, WT identification information 368, and timing information 370. Tone information 362 includes a set of tones defined to be used for processing received second paging message signals in order to extract received second paging signal messages 346. In some embodiments, the tones follow a hopping sequence.

Modulation information 364 includes information used in a coherent modulation scheme, e.g., Quadrature Phase Shift Keying (QPSK) or Quadrature Amplitude Modulation (QAM), used to demodulate second paging message signals into a received second paging signal message 346. The second paging signal message 346 includes second paging information bits 366.

Second paging information bits 366 include bits used for paging identification and/or bits used to convey additional information such as information providing specific paging instructions to the paged WT 300, e.g., transition to an on state, receive timing control information, send timing control information, send power control information, send status information, etc. Second paging information bits 366 include a greater number of bits than first paging information bits 356, in accordance with the invention. WT identification information 368 may include information allowing the WT 300 receiving the second paging information to identify that WT 300 is the specific intended recipient for a received second paging signal message 346. Such WT identification information 368 may include a full identifier which uniquely identifies the WT within the cell in which it is located and/or within the system 100. In some embodiments, identification information 368 includes enough bits to convey a full IP address. In other embodiments, the WT identification information 368 includes a partial identifier, such that when the information from the identification bits from the received second paging message 346 are combined with the information conveyed by the group identification bit or bits of the received first paging signal message 344, the full unique identifier, e.g., IP address, of the intended recipient of the received second paging message 346, can be determined. The determined IP address can, and normally is, compared against the IP address 376 of WT 300 for a match.

Timing information 370 includes information which indicates when to look for the second paging message signals from BS 200. For example, the group corresponding to WT 300 may be assigned a few consecutive OFDM symbol times within a paging interval during which they are to look for second paging signals and capture a received second paging signal message 346.

Received first paging signal messages 344 are messages obtained from received first paging signals (transmitted from BS 200) conveying first paging information bits 356. Received first paging signal messages 344 are obtained by WT 300 by using the first paging signal detection module 334 to control the operation of the first demodulation module 314 to demodulate received first paging signals. Decoding of the first paging signals is in accordance with the non-coherent modulation scheme used to modulate the first paging signals.

Received second paging signal messages 346 are messages obtained by WT 300 by using the second paging signal detection module 336 to control the operation of the second demodulation module 316 to demodulate received second paging signals (transmitted from BS 200). Second paging signals are decoded in accordance with the coherent modulation scheme used to modulate the second paging signals. Thus, in accordance with the invention, first and second paging signals are demodulated.

Received second paging signal messages convey second paging information bits in the second paging information bits 366. Paging acknowledgement messages 348 are messages generated by WT 300 and transmitted to BS 200 in response to the successful reception of a second paging signal message 254 intended for the particular WT 300 that generates the acknowledgement. The paging acknowledgement message 348 may be a short message, (e.g. one or a few bits), that is transmitted at a predetermined time (e.g., with respect to the second paging signal message), and may be assigned to a dedicated (reserved) air link resource (e.g., one tone symbol) corresponding to the transmitted second paging message. The timing convention between the BS 200 and WT 300 in regard to paging signals and acknowledgment signals may follow an agreed upon predetermined method or schedule known to both BS 200 and WT 300.

WT information 350 includes data 372, terminal ID information 374, IP address information 376, received paging information 378, and mode information 380. Data 372 may include data to be transmitted to BS 200 (e.g. user data intended to be forwarded to a peer node of WT 300) and data received from BS 200. Terminal ID information 374 may be an identifier for WT 300 assigned by BS 200. IP Address information 290 may be an identifier unique to the WT 300 and may be base station independent. Received paging information 378 includes first paging signal information 382 and second paging signal information 384. First paging signal information 382 may include information included in those received first paging signal messages 344 intended for WT 300, including a group ID of which WT 300 is a member of the group. Second paging signal information 384 may include information included in received second paging signal messages 346 intended for WT 300 including information to uniquely identify WT 300 within a cell and/or system 100, and additional paging information such as the type of page, e.g., with the type corresponding to the type of information included in the page. Mode information 380 may specify the state of WT 300 (e.g., ON state, sleep state, etc.).

Communications routines 326 implement the various communications protocols used by the wireless terminal 300. Wireless terminal control routines 330 control the functional operation of the wireless terminal 300 including operation of the receiver 302, transmitter 304, power control, timing control, and paging signaling in accordance with the present invention. The signaling routines 330 use the data/information 324 to control the operation of the receiver 302 to receive and process signals (including first paging signal messages and second paging signal messages) from BS 200 and to operate the transmitter 304 to transmit signals (including paging acknowledgement messages 348) to BS 200. Timing module 332 uses the data/information 324 including first paging signal timing information 360 and second paging signal timing information 370 to activate the WT: to wake from sleep at the appropriate times to receive first paging signals, to return to sleep at appropriate times, to receive second paging signals at appropriate times, and to send acknowledgment messages 348 at appropriate times. First paging signal detection module 334 uses data/information 324 including first paging signal system information 340 and WT information 350 to control the receiver 302 to receive first paging signals and to control the operation of the first demodulation module 314, e.g., to perform a non-coherent demodulation of the received first paging signal, to recover a first paging signal message 344. First paging signal detection module 334 also uses data/information 324 to extract first paging signal information 382 corresponding to first paging information bits 356 from the received first paging signal message 344, determines whether the WT 300 is a member of a group intended to be a recipient of the page, and take appropriate action (e.g., activates transition back to sleep or activates second paging signal detection module 336.) Second paging signal detection module 336 uses data/information 324 including second paging signal system information 342 and WT information 350 to control the receiver 302 to receive second paging signals and to control the second demodulation module 316 to demodulate the received second paging signals into received second paging signal messages 344. Second paging signal detection module use data/information 324 to determine whether WT 300 is the intended recipient of the page. If WT 300 is the recipient, information in the received second paging message 346 corresponding to the second paging information bits 366 is conveyed to the WT second paging signal information 384, and a paging acknowledgement signal message 348 is generated and transmitted by transmitter 304 at the appropriate time determined by the timing module 332. The second paging signal detection module also controls the WT 300 to take appropriate action to perform the instructions conveyed in the received second paging signal message 346.

Figure 4:
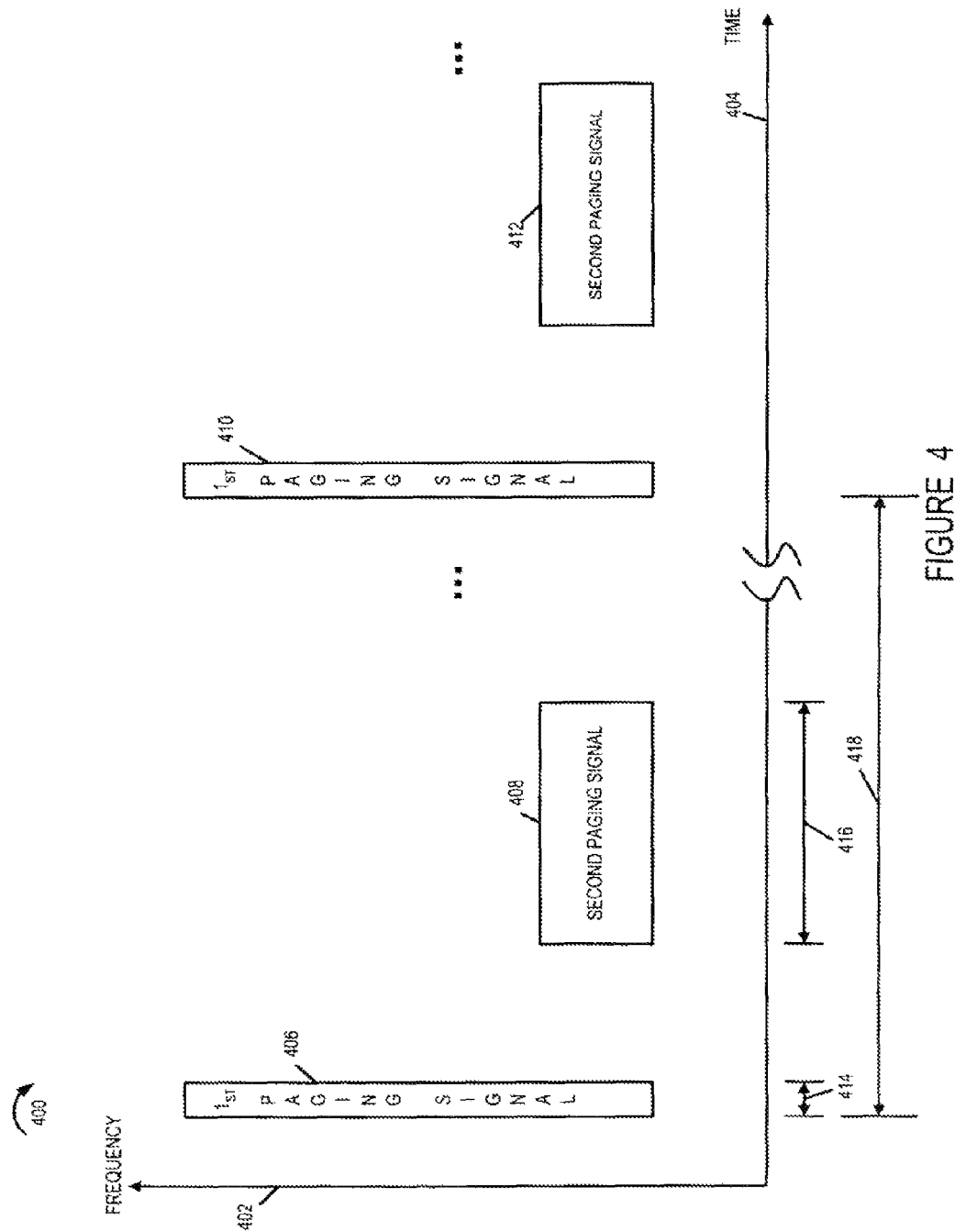
FIG. 4 illustrates exemplary downlink first and second paging signals in accordance with the present invention.

FIG. 4 illustrates signaling for two step paging and two distinct types of paging signals that may be used in exemplary communications system 100 in one exemplary embodiment of the present invention. FIG. 4 is a graph 400 of frequency on the vertical axis 402 vs time on the horizontal axis 404. Paging interval 418 represents the time between successive first paging signals 406, 410. Paging interval 418 includes a first paging signal 406 followed by a second paging signal 408. The first paging signal 406 occupies a very short time duration 414 (e.g., one OFDM symbol) and uses a non-coherent modulation method. The second paging signal 408 occupies a small number of OFDM symbols 416 (e.g., less than 10) to minimize the processing cost of receiving the channel and uses a coherent modulation method. The first paging interval 418 is followed by a second paging interval including a first paging signal 410 and a second paging signal 412.

The first paging signal 406 conveys one bit of information, which indicates whether a user (e.g. WT 300), or in general a group of users, are being paged. If the first paging signal 406 if the information bit is zero, no user is being paged. If the first paging signal information bit is one, at least one of the users (e.g. WT 300) in the group is being paged. The operation of a user (WT 300) includes two steps. When the user (WT 300) wakes up, the user (WT 300) first receives the first paging signal 406. If the user detects that the first paging signal 406 information bit is zero, the user (WT 300) goes back to the sleep state. Otherwise, the user (WT300) continues operation to receive a detailed paging message in the second paging signal 408. The second paging signal 408 may include detailed paging information, such as the type of page (e.g., whether the user is asked to access the base station or to receive additional messages in other well-defined downlink channels). Moreover, if a group of users monitor a single first paging signal 406, the second paging signal 408 may include a detailed paging identifier of the paged user(s) so that the group member for which the page is intended can be identified.

Note that the above method is applicable to a system that supports the notion of user groups. In particular, a user can be a member of one or multiple user groups. For paging purposes, a user may have its own user paging identifier and also have paging identifiers for the associated user groups to which the user belongs. In this case, the user shall monitor paging messages with its own user paging identifier and with the associated user group paging identifiers. Without loss of generality, in the following we do not explicitly discuss user groups, with the understanding that the methods in this invention can be applied to paging for user groups as well.

Figure 5:
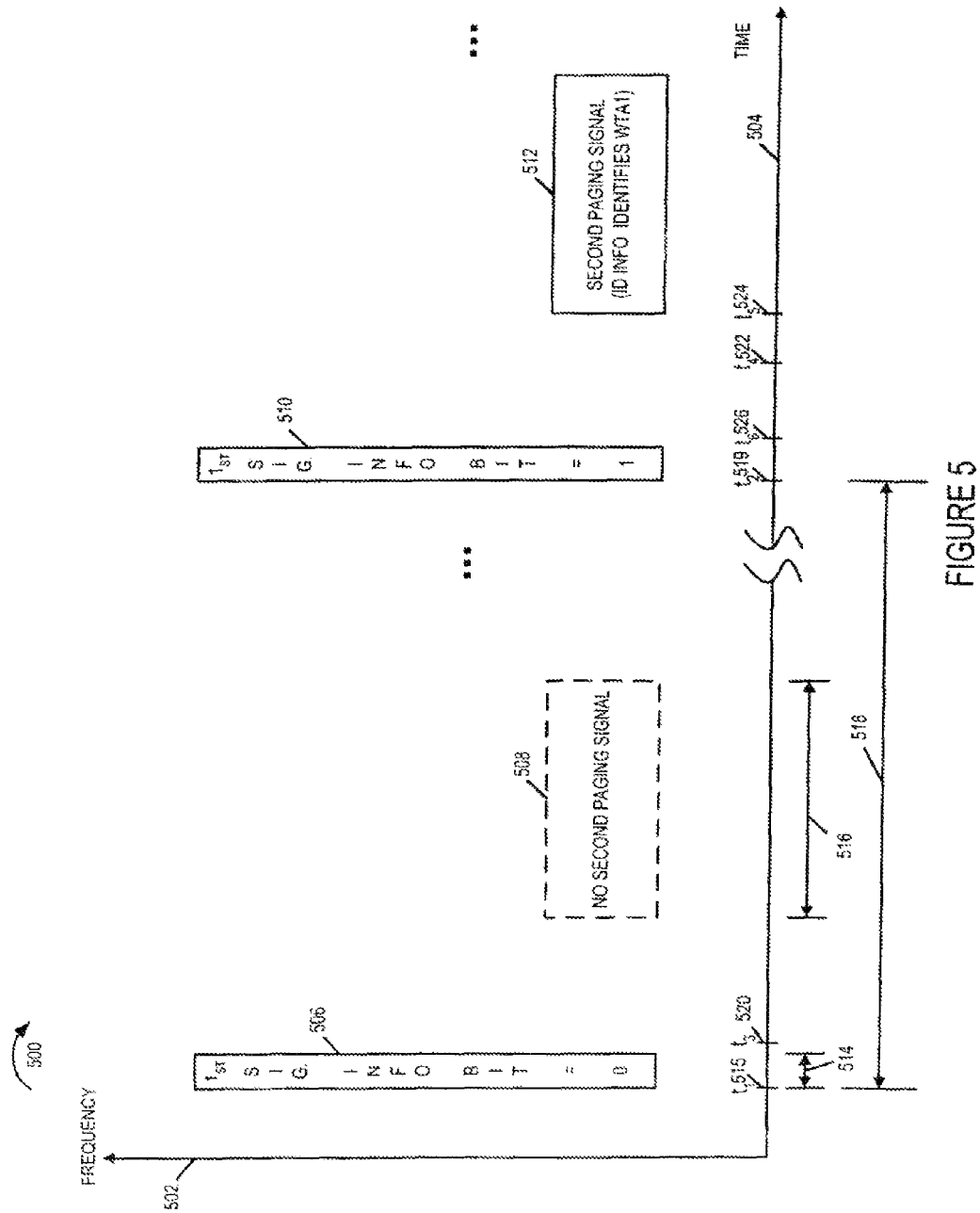
FIG. 5 illustrates exemplary downlink first and second paging signals illustrating information conveyed in accordance with the present invention.

FIG. 5 illustrates the user operation of the above two-step paging method described in FIG. 4. FIG. 5 includes a graph 500 of frequency on the vertical axis 502 vs time on the horizontal axis 504. Consider two users, WTA1 and WTA2, which both monitor the downlink channel assigned for first paging signal 506. At time $t_1$ 515, both WTA1 and WTA2 wake up and receive the first paging signal 506. Suppose that the base station 200 does not page either of them, and thus transmits the first paging signal information bit=0. After receiving the first paging signal 506, both WTA1 and WTA2 go back to the sleep state. As the first paging signal information bit is 0, the base station 200 does not transmit the second paging signal (as indicated by dashed line box 508). After one paging interval 518, both WTA1 and WTA2 wake up again and receive another first paging signal 510 at time $t_2$ 519. Suppose that the base station 200 pages WTA1, and thus sets the first paging signal information bit=1. Upon the reception of the first paging signal 510, both WTA1 and WTA2 continue operation to receive the second paging signal 512. The second paging signal 512 includes the paging identifier of user WTA1. Upon the reception of the second paging signal 512, user WTA1 will follow the instruction, if any, included in the second paging signal message and user WTA2 will return to the sleep state after determining that the identifier in signal 512 does not match WTA2's identifier. Note that though users WTA1 and WTA2 have the same paging interval in the above example, in general different users can have different paging intervals.

The distinction between $1^{st}$ and $2^{nd}$ paging type signals of FIG. 5 shall be further described. In FIG. 5, in accordance with the invention, different modulation schemes are used for the first paging type signals, e.g., signals (506, 510) and the second paging type signals, e.g. signal 512. First paging signal 506 uses a first type of modulation, e.g., a non-coherent modulation scheme that does not require channel information to decode the modulated information. WTA1 and WTA2, can wake up at time $t_1$ 515, at the beginning of the first paging signal 506, receive the 1 or 2 OFDM symbols of the first paging signal of duration 514, process, e.g., perform FFTs on those 1 or 2 received OFDM signals, and determine the value of the information bit or bits included in the first paging signal. Since the exemplary information bit in first paging signal 506 is 0, the WTs recognize that there will not be a corresponding second paging signal 508, and thus go back to sleep at time $t_3$ 520 to conserve power. Similarly, first paging signal 510 uses a non-coherent modulation scheme. WTA1 and WTA2, can wake up at time $t_2$ 519, at or just before the beginning of the first paging signal 510, receive the 1 or 2 OFDM symbols of the first paging signal, process, e.g., perform FFTs on those 1 or 2 received OFDM signals, and determine the value of the information bit without the need for a channel estimate or other current channel information. Since the information bit in first paging signal 510 is 1, the WTs recognize that there will be a corresponding second paging signal 512, and, in some embodiments, remain on, e.g., in an active state which consumes more power than said sleep state. The second type paging signal 512 uses a modulation scheme which requires the use of channel information to demodulate the modulated information, e.g., a coherent modulation scheme. At some time $t_4$ 522 prior to time $t_5$ 524, the start of reception of the second paging signal 512, WTA1 and WTA2 start to receive signals, e.g., pilot symbols. While multiple symbols may be transmitted during each symbol period, e.g., using different tones, only a few of the symbols in any given symbol time, e.g., the time used to transmit a symbol, may be a pilot symbol. To obtain an accurate estimate across the different frequencies, e.g., tones, it may take several symbol times to receive a sufficient number of pilot symbols to produce a reliable estimate of the communications channel being used to transmit paging signals. Beginning at $t_4$ 522, WTA1 and WTA2 may, e.g., for 4 symbol periods, prior to $t_5$ 524, perform FFTs on received signals in order to establish a reliable channel estimate. The established channel estimate is used by the WTA1 and WTA2 when decoding the second paging signal 512.

Time $t_6$ 526 is the time that the WTs have completed processing of the $1^{st}$ paging signal 510. In some embodiments, e.g., where the WTs remain ON, the WTs may use the entire duration from $t_6$ 526 to $t_5$ 524 to establish the channel estimate. However, in some embodiments, the WTs go back into a sleep state, even though information bit=1 and wake up again at time $t_4$ 522 in order to receive and process enough information, e.g., enough pilot signals, so that a channel estimate is established and can be used at time $t_5$ 524, the start of the second paging signal 512. The wake up at $t_4$ 522 would not have occurred if the information bit in signal 510 was 0 indicating no second paging signal was to be received. In some embodiments, 4 pilot symbols are transmitted during one symbol time, and the time interval between $t_4$ 522 and $t_5$ 524, used to establish the channel estimate, is 3-5 symbol times. Note, that in comparison the wireless terminals do not need to wake-up before the $1^{st}$ paging signals (506, 510), since $1^{st}$ paging signals (506, 510) use non-coherent modulation which does not require a channel estimate to recover the information being conveyed.

Figure 6:
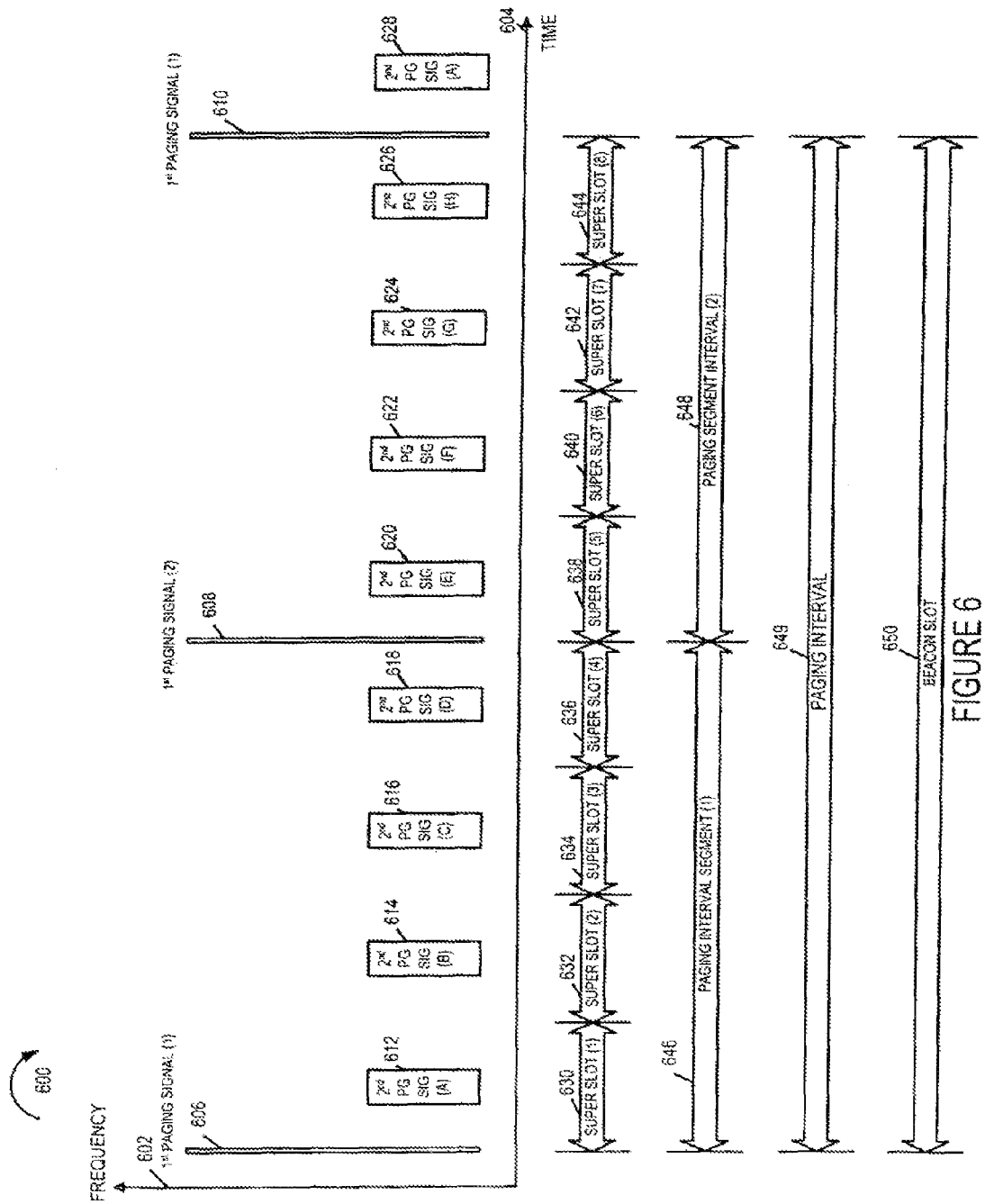
FIG. 6 illustrates downlink two-stage paging signaling in an exemplary embodiment using 8 paging groups in accordance with the present invention.

FIG. 6 illustrates other embodiments of the two-step paging system of the present invention where each first paging signal contains multiple information bits, each information bit is associated with one second paging group. In one embodiment of FIG. 6, each first paging signal conveys four information bits. Each of the four information bits specifies whether a user of the corresponding group of users is being paged, and if so, a corresponding second paging signal shall be transmitted in the reserved slot (e.g., using reserved frequencies at a predetermined time). Second paging signals in this embodiment include detailed paging information (e.g., the paging type and a paging identifier corresponding to the paged wireless terminal).

FIG. 6 is a diagram 600 illustrating frequency (e.g., tones used for downlink paging signals) on the vertical axis 602 vs time on the horizontal axis 604. Three exemplary first paging signals 606, 608, 610 and nine exemplary second paging signals 612, 614, 616, 618, 620, 622, 624, 626, 628 are shown in FIG. 6. First paging signals 606 and 610 include information bits corresponding to paging groups A, B, C, and D. First paging signal 608 includes information bits associated with paging groups E, F, G, and H. Each of the paging groups (A, B, C, D, E, F, G, H) may include multiple users (e.g., (WTA1, WTA2), (WTB1, WTB2), (WTC1, WTC2), (WTD1, WTD2), (WTE1, WTE2), (WTF1, WTF2), (WTG1, WTG2), (WTH1, WTH2), respectively). A beacon slot 650 includes two paging interval segments, a first paging interval segment (1) 646 and a second paging interval segment (2) 648. First paging interval segment (1) 646 and second paging interval segment (2) 648 comprise paging interval 649, which correspond to beacon slot 650. Beacon slot 650 includes 8 super slots: super slot (1) 630, super slot (2) 632, super slot (3) 634, super slot (4) 636, super slot (5) 638, super slot (6) 640, super slot (7) 642, and super slot (8) 644. Each super slot, e.g., super slot (1) 630 represents the repeat time interval for a downlink traffic channel tone hopping sequence. Beacon slot 650 represents a repeat time interval based on beacon signal transmissions from the base station. In this example, the beacon slot 650 corresponds to the paging interval 649 and represents the repeat time interval for one set of paging signals for the system including paging opportunities for each of the paging groups A, B, C, D, E, F, G, and H. Each paging interval segment 646, 648 represents the time interval associated with one first paging signal and opportunities for four second paging signals. Paging interval (1) 606 includes first paging signal (1) 606, second (group A) paging signal 612, second (group B) paging signal 614, second (group C) paging signal 616, and second (group D) paging signal 618. Paging interval (2) 648 includes first paging signal (2) 608, second (group E) paging signal 620, second (group F) paging signal 622, second (group G) paging signal 624, and second (group H) paging signal 626.

Paging groups A, B, C, D monitor first paging signal (1) 606, while paging groups E, F, G, and H monitor first paging signal (2) 608. Paging group A monitors the first information bit of first paging signal (1) 606, which corresponds to second (group A) paging signal 612. Paging group B monitors the second information bit of first paging signal (1) 606, which corresponds to second (group B) paging signal 614. Paging group C monitors the third information bit of first paging signal (1) 606, which corresponds to third (group C) paging signal 616. Paging group D monitors the fourth information bit of first paging signal (1) 606, which corresponds to second (group B) paging signal 618. Paging group E monitors the first information bit of first paging signal (2) 608, which corresponds to second (group E) paging signal 620. Paging group F monitors the second information bit of first paging signal (2) 608, which corresponds to second (group F) paging signal 622. Paging group G monitors the third information bit of first paging signal (2) 608, which corresponds to third (group G) paging signal 624. Paging group H monitors the fourth information bit of first paging signal (2) 608, which corresponds to second (group H) paging signal 626.

The operation of a user device (e.g., WT 300) is similar to that illustrated in FIG. 5 with respect to each paging group. Consider that exemplary paging group A includes wireless terminals WTA1 and WTA2. Wireless terminal WTA1 monitors the first information bit of the first paging signal (1) 606. If the first information bit is 0, wireless terminal WTA1 goes back to the sleep state until the next first paging signal (1) 610. If the first information bit is 1, wireless terminal WTA1 shall continue operation and receive second (group A) paging signal 612. Meanwhile, if the first information bit is 0, the base station 200 can suspend the transmission of the corresponding second (group A) paging signal 612. If the first information bit is 1, the base station 200 has to send detailed paging information in the second (group A) paging signal 612.

One potential drawback of the above embodiment is the possible paging delay due to congestion in an individual paging group. For example, if the base station 200 intends to individually page multiple wireless terminals which belong to the same paging group (e.g., WTA1 and WTA2 in group A), then as the base station 200 can only page one wireless terminal of a paging group at a time, the base station 200 may take multiple paging intervals (e.g., multiple paging interval segment (1) iterations) to page the wireless terminals. Suppose that the base station 200 intends to page both wireless terminals WTA1 and WTA2. Then paging group A is congested and it will take two iterations of paging interval segment (1) 646 to page WTA1 and WTA2. Note that when a paging group is congested, another paging group may be idle, i.e., no user of that paging group is to be paged. For example, when paging group A is congested, paging group B may be idle.

The following described exemplary embodiment reduces paging latency by sharing the second paging signal channel resource among different paging groups. Specifically, one first paging signal includes information bits including multiple paging group information bits and an extension bit. In FIG. 6, assume that that first paging signal (1) 606 conveys four paging group information bits (as described above) and an extension bit. Similar to the previous embodiment, each paging group information bit specifies whether a user of the corresponding paging group is paged. The user shall first receive the first paging signal (1). If the corresponding paging group information bit is 0, the user can go back to the sleep state. If the corresponding paging group information bit is 1, the user shall continue to operate to receive a detailed second paging message signal. If the paging group information bit is 1 and the extension bit is 0, then the detailed second paging message signal shall be received in the corresponding second paging signal slot, similar to the previous embodiment. However, if the paging group information bit is 1 and the extension bit is 1, then the detailed second paging message signal corresponding to the user can be sent in a different second paging signal slot than is normally used. In one embodiment, with paging group information bit=1 and extension bit=1 the detailed second paging message signal can be sent in any of the four second paging signal channel slots subsequent to the first paging signal. In this case, the user continues operation to receive and process signals in each of the four second paging signal slots.

Suppose that the base station 200 intends to page two wireless terminals, WTA1 and WTA2 (both in paging group A.) The base station 200 shall set each of the paging group information bits in first paging signal (1) 606 to 0 except for the first paging group information bit which is set to 1 (corresponding to paging group A). BS 200 shall also set the extension bit to be 1 in first paging signal (1) 606. The base station 200 can send the second paging message signals for WTA1 and WTA2 in any two of the four subsequent second paging signal slots corresponding to 612, 614, 616, 618, allowing both WTA1 and WTA2 to be both paged in one paging interval (1) 646 and thereby reducing the paging latency.

In another embodiment, the extension bit=1, indicates that WTs from a group with a group information bit=1, shall have a second paging signal transmitted in either its own group slot or a slot with a group information bit=0 during that paging interval. WTs can use the information in the first paging signal (1) 606 is determine which of the subsequent second paging signals 612, 614, 616, 618 to receive and process for candidate paging signals directed to the WT.

Figure 7:
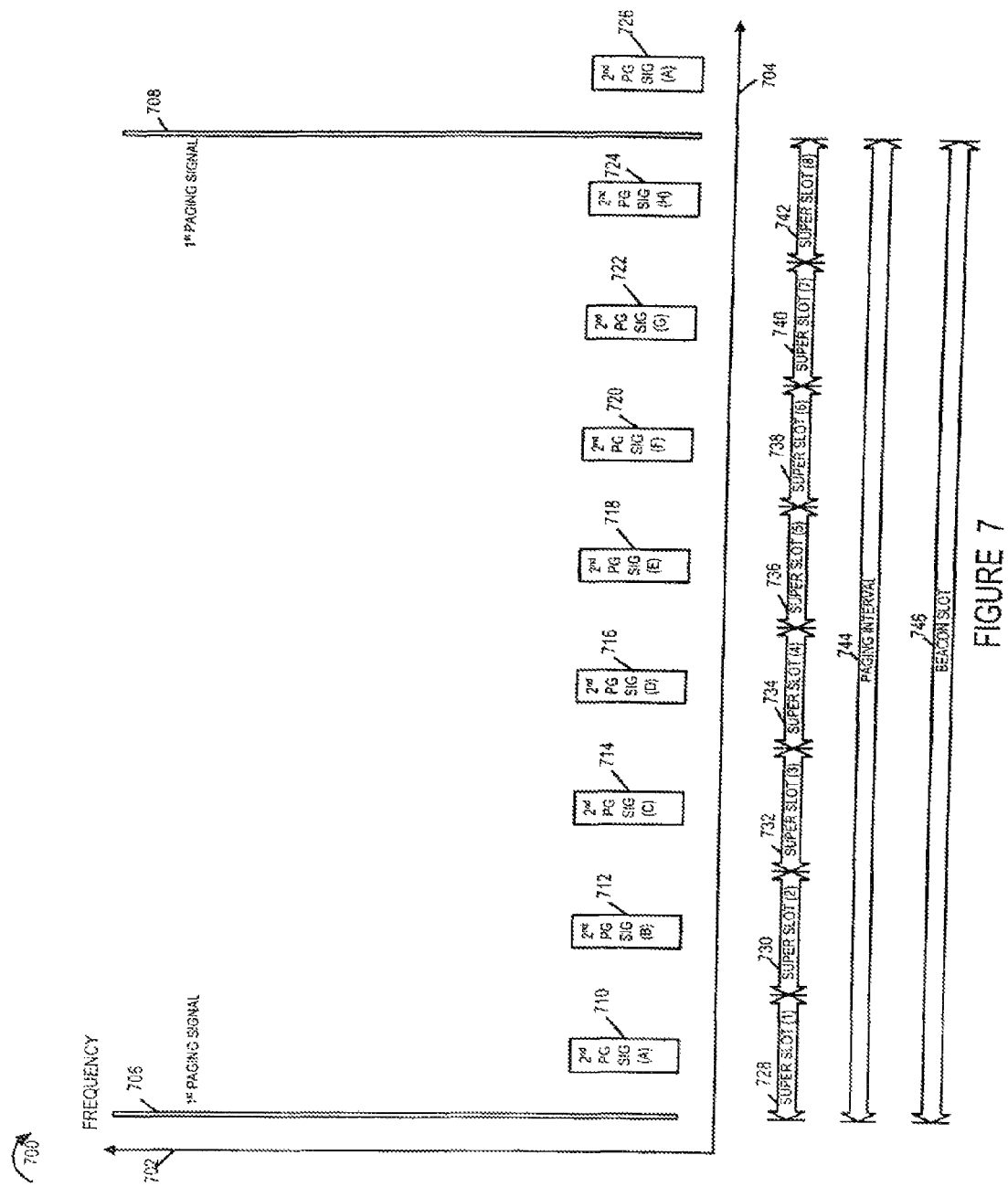
FIG. 7 illustrates downlink two-stage paging signaling in another exemplary embodiment using 8 paging groups in accordance with the present invention.

FIG. 7 illustrates another exemplary embodiment of a two stage paging system in accordance with the present invention. FIG. 7 is a graph 700 illustrating frequency (used for downlink paging signals) on the vertical axis 702 vs time on the horizontal axis 704. Two exemplary first paging signals 706, 708 and nine exemplary second paging signals 710, 712, 714, 716, 718, 720, 722, 724, 726 are shown in FIG. 7. First paging signals 706 and 708 include eight group information bits, one group information bit is identified with each paging group A, B, C, D, E, F, G, H. A beacon slot 746 includes one paging interval 744 and 8 super slots: super slot (1) 728, super slot (2) 730, super slot (3) 732, super slot (4) 734, super slot (5) 736, super slot (6) 738, super slot (7) 740, and super slot (8) 742. The beacon slot 746 represents the repeat time interval for one set of paging signals for the system including paging opportunities for each of the paging groups A, B, C, D, E, F, G, and H. Paging interval 744 includes first paging signal (1) 706, second (group A) paging signal 710, second (group B) paging signal 712, second (group C) paging signal 714, and second (group D) paging signal 716, second (group E) paging signal 718, second (group F) paging signal 720, second (group G) paging signal 722, and second (group H) paging signal 724.

The same method described with respect to the four group information bits included in first information signal (1) 606 of FIG. 6 may be applied to the eight group information bits in first information signal 706 of FIG. 7. For example, if first paging signal 706 information bits=00100010, two second paging signals would be sent to two WTs (e.g., WTC1 and WTG1) using a second (group C) paging signal 714 and a second (group G) paging signal 722.

In addition, in some embodiments, an extension bit may be added to the eight group information bits of first information signal 706 using the same or similar conventions to those discussed with respect to FIG. 6. For example, if the first paging signal 706 information bits=00010000 1, in one embodiment, two second paging signals could be sent to two members of group D (e.g., WTD1 and WTD2) using any two of the eight second paging slots 710, 712, 714, 716, 718, 720, 722, 724.

Consider the example of FIG. 7, where each wireless terminal specific ID (e.g., WT IP address 376) includes 32 bits. In one embodiment, each wireless terminal specific ID of 32 bits may be mapped to 3 bits (e.g., via a hash function) specifying one of the eight groups (A, B, C, D, E, F, G, H). The 3 bits can identify into which group the base station 200 should direct second paging messages for WT 300 and which second regular paging slot WT 300 should look at for potential second paging messages. BS 200 can include additional identification information (e.g., 29 additional identification bits) in the second paging message which may be used to identify the specific WT 300 intended for the page.

Figure 8:
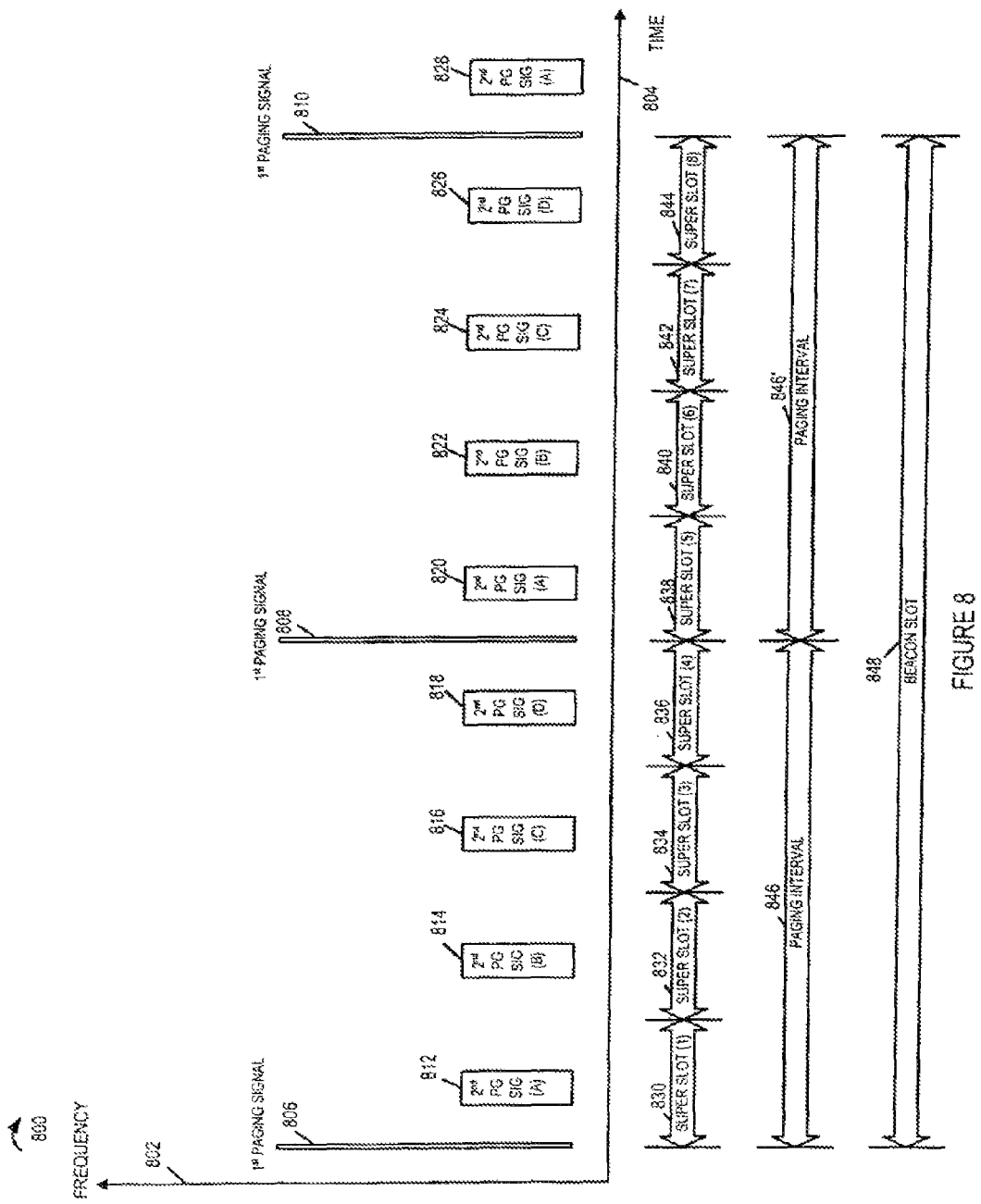
FIG. 8 illustrates downlink two-stage paging signaling in another exemplary embodiment using 4 paging groups in accordance with the present invention.

FIG. 8 illustrates another exemplary embodiment of a two stage paging system in accordance with the present invention. FIG. 8 is a graph 800 illustrating frequency (used for downlink paging signals) on the vertical axis 802 vs time on the horizontal axis 804. Three exemplary first paging signals 806, 808, 810 and nine exemplary second paging signals 812, 814, 816, 818, 820, 822, 824, 826, 828 are shown in FIG. 8. First paging signals 806, 808, 810 include four group information bits, one group information bit identified with each paging group A, B, C, D. A beacon slot 848 includes two paging intervals 846, 846' and 8 super slots: super slot (1) 830, super slot (2) 832, super slot (3) 834, super slot (4) 836, super slot (5) 838, super slot (6) 840, super slot (7) 842, and super slot (8) 844. The beacon slot 848 represents the repeat time interval for two sets of paging signals for the system including two sets of paging opportunities for each of the paging groups A, B, C, D. Paging interval 846 includes first paging signal 806, second (group A) paging signal 812, second (group B) paging signal 814, second (group C) paging signal 816, and second (group D) paging signal 818. Paging interval 846' includes first paging signal 808, second (group A) paging signal 820, second (group B) paging signal 822, second (group C) paging signal 824, and second (group D) paging signal 826. In FIG. 8, the repeat time between successive opportunities for a specific (e.g., group A) second paging group is four super slots, while in FIG. 6 or FIG. 7, the repeat interval is eight super slots.

The same method described with respect to the four group information bits included in first information signal (1) 606 of FIG. 6 may be applied to the four group information bits in first information signal 806 of FIG. 8. In addition, in some embodiments, an extension bit may be added to the four group information bits of first information signal 806 using the same or similar conventions to those discussed with respect to FIG. 6.

This method described with respect to FIG. 8 can provide an advantage over the method of FIG. 6 or FIG. 7 in some applications (e.g., where minimizing the paging interval for an individual WT 300 is important and the system dynamics can support a larger number of users in each group). In addition, by using the method of FIG. 8, if two members of the same group (e.g., group A) require a page (and the implementation does not support an extension bit), the BS 200 may be able to distinguish which page is more time critical, e.g., by prioritizing pages based on queues, quality of service requirements, etc., and then assigning that page to first paging signal 806 and second (group A) paging signal 812, while holding off the less time critical page to first paging signal 808 and second (group A) paging signal 820.

Figure 9:
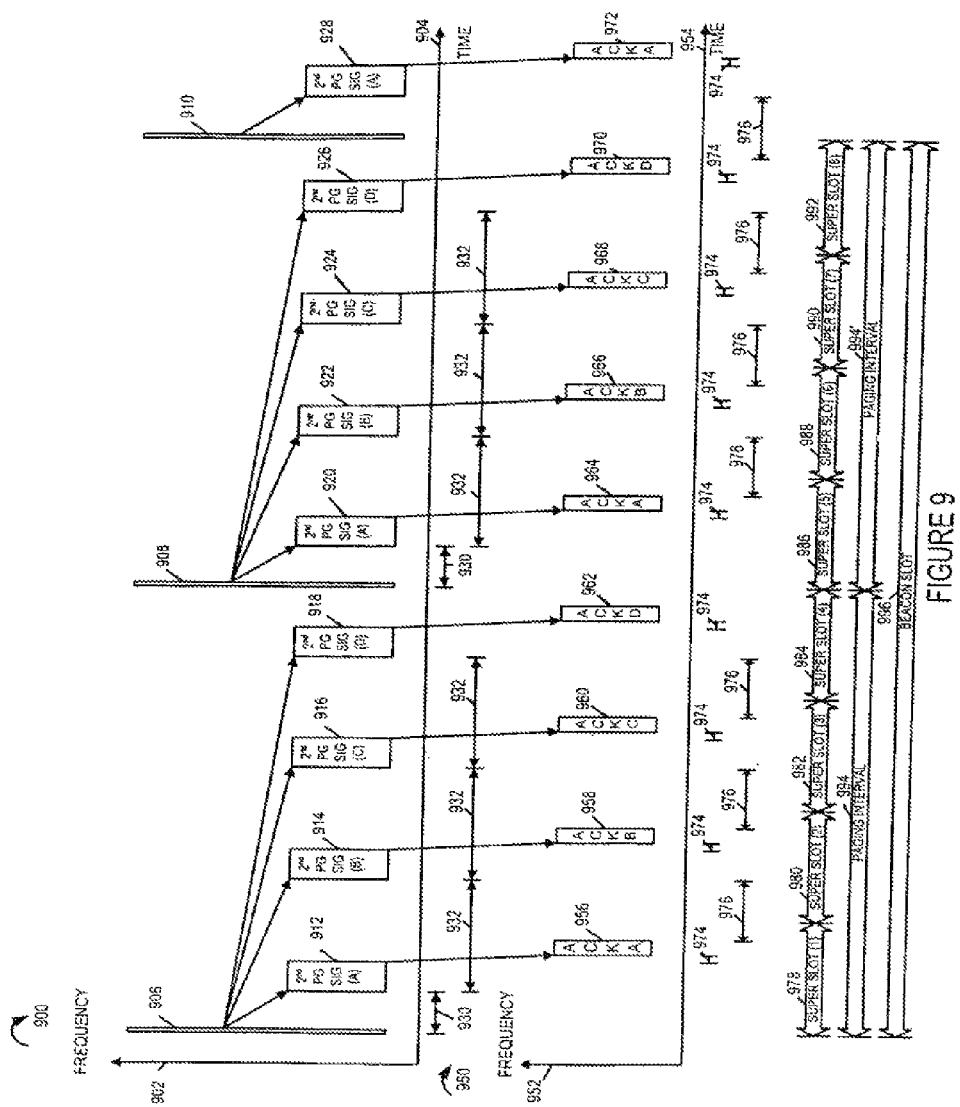
FIG. 9 illustrates the downlink two-stage paging signaling of FIG. 8, acknowledgement uplink signaling, and timing relationships between the signaling in accordance with the present invention.

FIG. 9 illustrates exemplary downlink paging signaling, exemplary uplink acknowledgement signals, and timing interrelationships between the signaling in accordance with the invention. FIG. 9 includes diagram 900 illustrating frequency (e.g., corresponding to tones used for downlink paging signals from BS 200 to WTs 300) on the vertical axis 902 vs time on the horizontal axis 904. Three exemplary first paging signals 906, 908, 910 and nine exemplary second paging signals 912, 914, 916, 918, 920, 922, 924, 926, 928 are shown in FIG. 9. First paging signals 906, 908, 910 include four group information bits, one group information bit identified with each paging group A, B, C, D. A beacon slot 996 includes two paging intervals 994, 994' and 8 super slots: super slot (1) 978, super slot (2) 980, super slot (3) 982, super slot (4) 984, super slot (5) 986, super slot (6) 988, super slot (7) 990, and super slot (8) 992. The beacon slot 996 represents the repeat time interval for two sets of paging signals for the system including two sets of paging opportunities for each of the paging groups A, B, C, D. Paging interval 994 includes first paging signal 906, second (group A) paging signal 912, second (group B) paging signal 914, second (group C) paging signal 916, and second (group D) paging signal 918. Paging interval 994' includes first paging signal 908, second (group A) paging signal 920, second (group B) paging signal 922, second (group C) paging signal 924, and second (group D) paging signal 926.

FIG. 9 also includes diagram 950 illustrating frequency (e.g., corresponding to tones used for uplink paging acknowledgement signals from WTs 300 to BS 200) on the vertical axis 952 vs time on the horizontal axis 954. For each second paging signal transmitted from BS 200 to WTs 300, there is a corresponding slot reserved for an acknowledgement from a WT 300 to BS 200. In an exemplary OFDM system, the dedicated uplink channel resource for each acknowledgement signal can be a few tones over a few OFDM-symbols or one OFDM tone-symbol, which is reserved for use by the intended recipient of the corresponding second paging signal.

Diagram 950 includes 9 exemplary acknowledgement signals: (group A) acknowledgement signal 956 (corresponding to second (group A) paging signal 912), (group B) acknowledgement signal 958 (corresponding to second (group B) paging signal 914), (group C) acknowledgement signal 960 (corresponding to second (group C) paging signal 916), (group D) acknowledgement signal 962 (corresponding to second (group D) paging signal 918), (group A) acknowledgement signal 964 (corresponding to second (group A) paging signal 920), (group B) acknowledgement signal 966 (corresponding to second (group B) paging signal 922), (group C) acknowledgement signal 968 (corresponding to second (group C) paging signal 924), (group D) acknowledgement signal 970 (corresponding to second (group D) paging signal 926), (group A) acknowledgement signal 972 (corresponding to second (group A) paging signal 928.

First paging signal 906 is synchronized with respect to super slot (1) 978, paging interval 994, and beacon slot 996. Time interval 930 represents the timing relationship between first paging signal 906 and second (group A) paging signal 912 slot. Time interval 932 represents the delay between subsequent second paging signal slot spacing in a paging interval, (e.g., the time between second (group A) paging signal 912 and second (group B) paging signal 914.).

FIG. 9 shows the uplink dedicated acknowledgment signals corresponding to the second paging message signals. In accordance with the invention, different users can use the acknowledgment channel over time. For example, during a first paging interval 994, second (group A) paging signal 912 may be intended for WTA1, and (group A) acknowledgement signal 956 may be transmitted by WTA1; subsequently during a second paging interval 994', second (group A) paging signal 920 may be intended for WTA2, and (group A) acknowledgement signal 964 may be transmitted by WTA2. Meanwhile the acknowledgment channel is used in a contention free manner.

In FIG. 9 second paging signals and acknowledgement signals have been shown in each of the potential slots. However, if no member of a specific group is to be paged in a given paging interval, then the first paging signal will convey that information and subsequently the corresponding second paging signal and acknowledgement signal will not be sent for that given group in the predetermined time slots.

In this particular exemplary embodiment, there is no explicit acknowledgment for the first paging signals. The uplink acknowledgment signals convey one bit information indicating a positive acknowledgment (indicating a successfully received second paging message) or a negative acknowledgement (indicating a received second paging message with an error condition). If the intended recipient of the second paging signal, e.g., WT 300, does not transmit a corresponding acknowledgement confirmation to BS 200, the BS 200 may assume that WT 300 has not received the second paging signal, and that retransmission of the second paging signal is required (if the page is still applicable).

After the base station 200 sends the second paging signal (e.g., second (group A) paging signal 912), the base station 200 should receive the corresponding uplink acknowledgment signal (e.g., (group A) acknowledgment signal 956) to verify that the paging message has been received correctly. If the base station 200 does not receive the acknowledgment, the base station 200 assumes that the paging has not been delivered and may thus retransmit the paging in a later second paging signal. If the base station 200 receives a negative acknowledgement, the base station 200 has been notified that the intended recipient has received a second paging message with an error, and the base station may thus retransmit the paging in a second later message. Given that the paging interval is short with the current invention, the retransmission latency is also not long. Consequently, in some embodiments, the base station can transmit the paging message multiple times to boost the paging reliability.

Time interval 974 represents the delay between a second paging signal and a corresponding acknowledgement signal, e.g., the time between second (group A) paging signal 912 and (group A) acknowledgement signal 956. Note that the acknowledgment signal 974 precedes the subsequent second paging signal (e.g., second (group B) paging signal 916 by time interval 976. In some embodiments, the BS 200 may retransmit an unacknowledged or negatively acknowledged second paging signal in the next subsequent available second paging slot (e.g., if the extension bit=1). In some embodiments, the BS 200 may retransmit an unacknowledged or negatively acknowledged second paging signal in the next paging interval including another first paging signal and another second paging signal.

The paging retransmission mechanism can also help to reduce the average power required to send the paging signals. Specifically, as the paging signals are sent to the user (e.g., WT 300) in the sleep state, the base station 200 generally does not know the downlink channel condition of the user. In order to reach the user (e.g., WT 300), the base station 200 may have to use the worst-case power to send the paging signals, though often the user (e.g., WT 300) does not require such a high power to receive the paging signals. With the paging retransmission mechanism, the base station 200 may use a relatively small power to send the paging signals for the first transmission. If the user (e.g., WT 300) is close to the base station 200, then the user (e.g., WT 300) can receive the paging signals in the first time, thereby saving the downlink power. If the user (e.g., WT 300) is far from the base station 200 and cannot receive the paging signals in the first time, the base station 200 may, and sometimes does, increase the power in the second transmission to help reach the user. On average, the base station 200 can save transmission power in the downlink paging signals.

In some embodiments, BS 200 may use different power levels for first paging signals and second paging signal. For example, the power level applied to the first paging signals (potentially serving multiple users in multiple user groups) may use a fixed worst case power level, while the second paging signals may use variable power levels. In some embodiments, BS 200 may use may vary the power level of the second paging signal as a function of the number of failed paging attempts. For example, the power level of the second paging signal may be set low during the first attempt. Then, if a positive acknowledgement is not received, the power level may be increased for retransmission of the same second paging signal. In this way overall interference levels within the system may be reduced. Power levels of second paging signals may also be varied as a function of the time critically of the page and/or the level of service.

Note that because the user (e.g., WT 300), which receives the downlink paging signals, just comes from the sleep state, the user may not be power or timing controlled. In accordance with the invention, the uplink paging acknowledgment channel may use a signaling format that does not interfere with other normal data transmission. In one such embodiment, the uplink paging acknowledgment signal is transmitted in a separate acknowledgement channel which is separate from the normal data transmission in a time division multiplexing (TDM) manner and where each uplink acknowledgement segment corresponds in a predetermined manner to a segment of a paging channel used to transmit paging signals. In addition, a long cyclic prefix is used so that even without timing synchronization, the uplink paging acknowledgment channel is still orthogonal to the uplink access channel. Moreover, since the uplink paging acknowledgment channel uses a similar signaling format, the base station 200 can treat the uplink paging acknowledgment channel as a special access attempt in the case where the base station 200 instructs the user (e.g., WT 300) to go back to the active state. For example, the base station 200 can determine the timing correction from the uplink paging acknowledgment channel signal and start to correct the timing of the user (e.g., WT 300) and grant the user appropriate air link channel resource required to establish active connection.

In some embodiments, (e.g., where the first paging signal conveys information allowing identification of the specific paged wireless terminal), acknowledgement signals may be sent by WT 300 in response to first paging signals.

In other embodiments of the invention, the designated slot for each paging group is not fixed but may vary based on a predetermined understanding between the base station 200 and WTs 300. For example, consider the eight paging groups (A, B, C, D, E, F, G, H) of FIG. 7 and assume that an extension bit is not used. During one exemplary paging interval 744, the base station 200 desires to pages two WTs, (e.g., WTE1 and WTG1). BS 200 sends first paging signal 706 including information bits=00001010. Wireless terminals in group E and group G recognize that they have potential pages and that two groups have pages. In this embodiment, second paging signals may be advanced in slot positions to account for unused slots. The paging signal for WTE1 would be sent in the first second paging slot (e.g., the slot normally reserved for second (group A) paging signal 710), and the paging signal for WTG1 would be sent in the second paging slot (e.g., the slot normally reserved for second (group B) paging signal 712).

Figure 10:
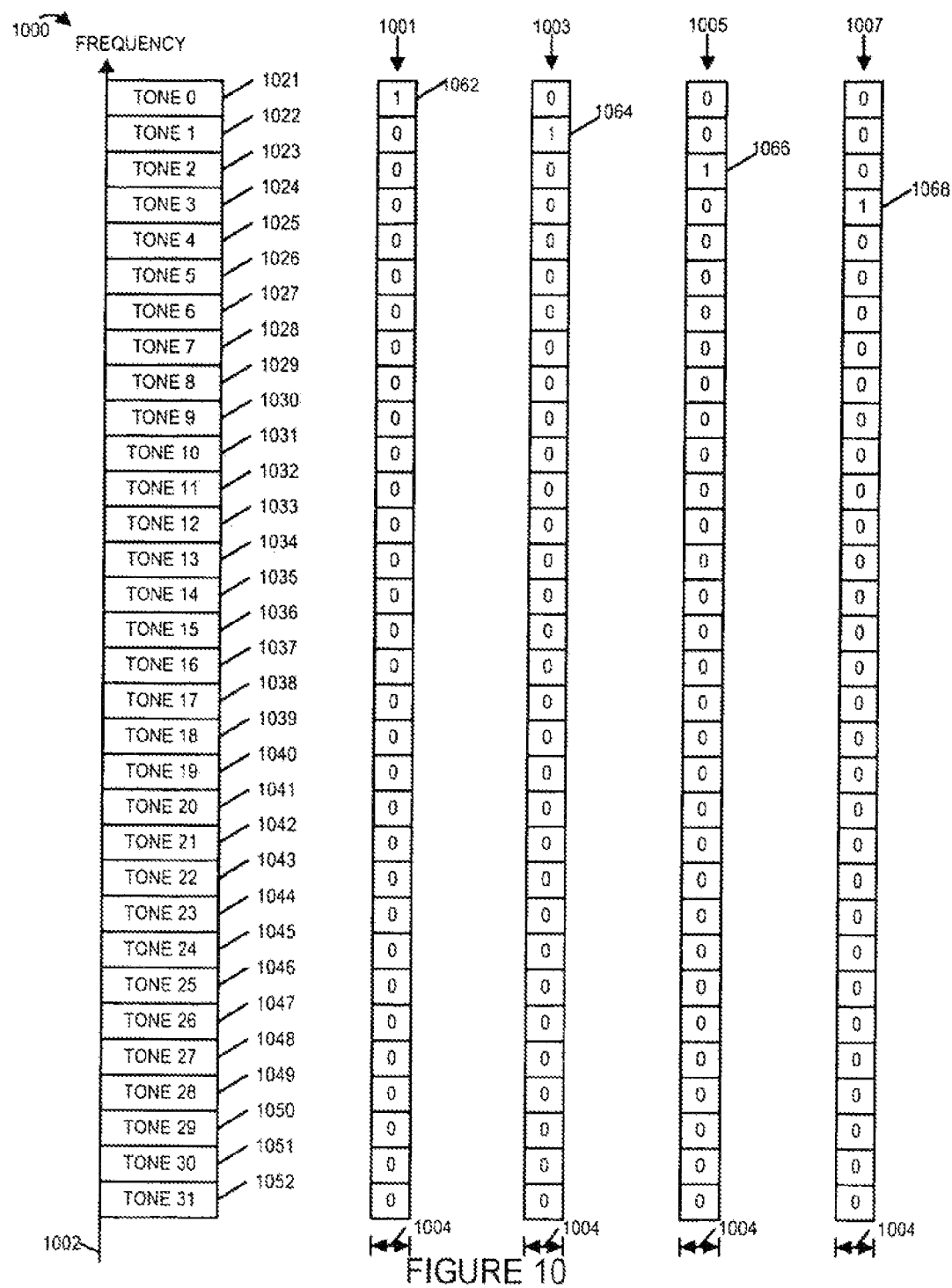
FIG. 10 illustrates an exemplary on/off non-coherent modulation scheme that may be used for first paging signals in accordance with the present invention.

FIG. 10 illustrates one exemplary method of a non-coherent modulation scheme that may be used to modulate 5 first paging information bits (e.g., first paging information bits 266) of first information messages (e.g., first paging signal messages 252) into first information signals. Drawing 1000 illustrates downlink frequency on axis 1002 divided between 32 tones (tone 0 1021, tone 1 1022, tone 2 1023, tone 3 1024, tone 4 1025, tone 5 1026, tone 6 1027, tone 7 1028, tone 8 1029, tone 9 1030, tone 10 1031, tone 11 1032, tone 12 1033, tone 13 1034, tone 14 1035, tone 15 1036, tone 16 1037, tone 17 1038, tone 18 1039, tone 19 1040, tone 20 1041, tone 21 1042, tone 22 1043, tone 23 1044, tone 24 1045, tone 25 1046, tone 26 1047, tone 27 1048, tone 28 1049, tone 29 1050, tone 30 1051, tone 31 1052.) The method illustrated in FIG. 10 is on/off keying. At any given time, for a first paging message signal transmission (e.g., an exemplary OFDM symbol time 1040) one tone in the set of 32 tones is transmitted with power applied and the other 31 remaining tones do not transmit anything. Four examples of first paging message signals are shown in FIG. 10. In exemplary first paging signal 1001, power is applied to tone 0 1021 (as indicated by a 1 in position 1062) and not applied to the other 31 tones in the tone set. In exemplary first paging signal 1003, power is applied to tone 1 1022 (as indicated by a 1 in position 1064) and not applied to the other 31 tones in the tone set. In exemplary first paging signal 1005, power is applied to tone 2 1023 (as indicated by a 1 in position 1066) and not applied to the other 31 tones in the tone set. In exemplary first paging signal 1007, power is applied to tone 3 1024 (as indicated by a 1 in position 1068) and not applied to the other 31 tones in the tone set. WTs 300 receiving the first paging signal do not need to establish a channel estimate. The WTs 300 can wake-up at the appropriate times, receive first paging message signals for one OFDM symbol period, perform an FFT, establish the one tone (frequency) of much higher power, and figure out the 5 information bits.

The on/off keying non-coherent modulation method described with reference to FIG. 5, illustrated by an exemplary 5 information bits and 32 tones may be applied in embodiments using a different number of first information bits and a different number of tones used (e.g., k information bits, $2^k$ tones).

In other embodiments, the 5 information bits may be conveyed by associating the on/off state of the 32 tones with 32 code words. In general, the k first information bits of the first paging signal may be conveyed by $2^k$ orthogonal units.

Figure 11:
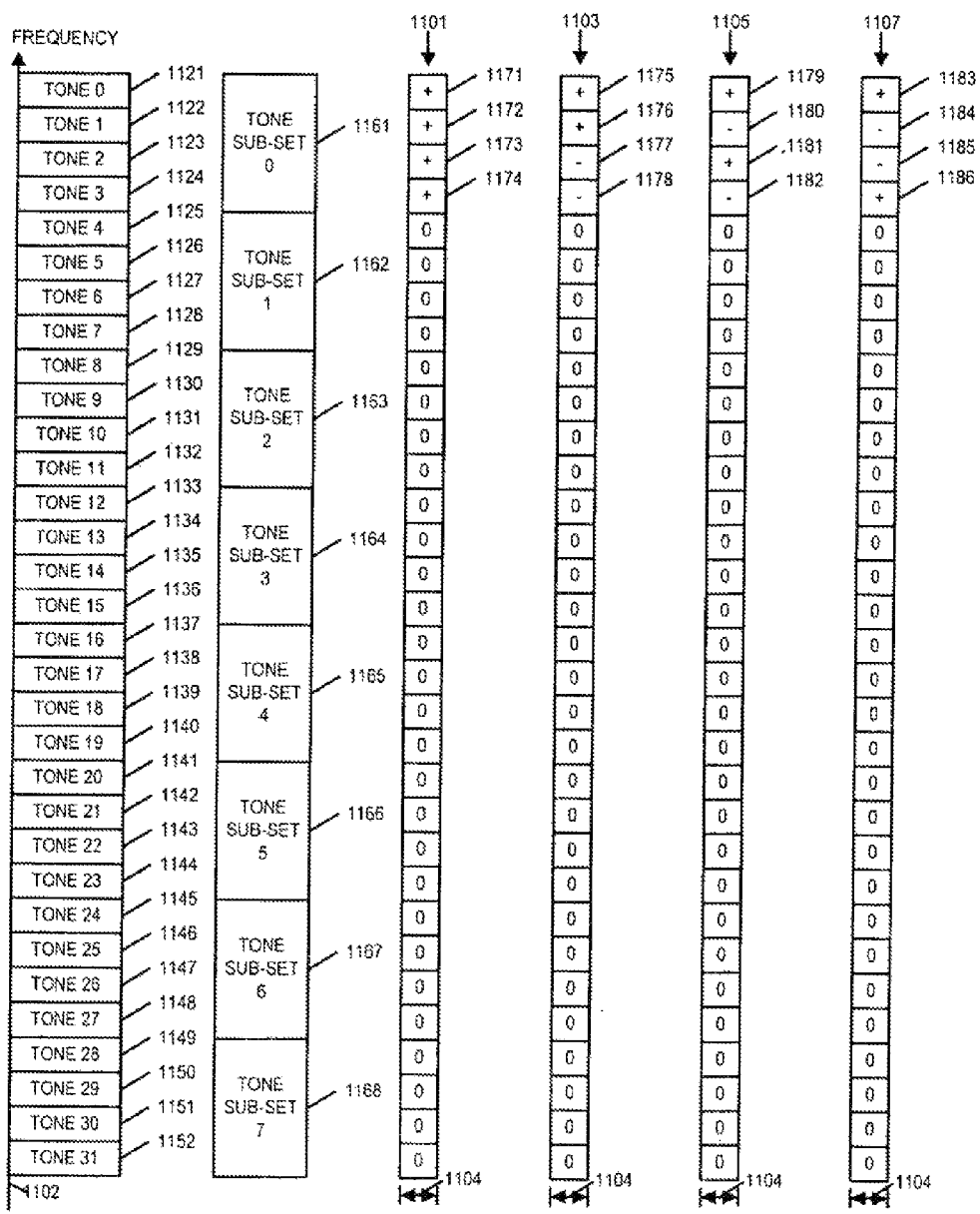
FIG. 11 illustrates another exemplary non-coherent modulation scheme (using on/off keying and orthogonal phase modulation) that may be used for first paging signals in accordance with the present invention.

FIG. 11 illustrate another exemplary method of a non-coherent modulation scheme that may be used to modulate 5 first information bits (e.g. first paging information bits 266) of information messages (e.g., first paging signal messages) into first information signals. Drawing 1100 illustrates downlink frequency on axis 1102 divided between 32 tones (tone 0 1121, tone 1 1122, tone 2 1123, tone 3 1124, tone 4 1125, tone 5 1126, tone 6 1127, tone 7 1128, tone 8 1129, tone 9 1130, tone 10 1131, tone 11 1132, tone 12 1133, tone 13 1134, tone 14 1135, tone 15 1136, tone 16 1137, tone 17 1138, tone 18 1139, tone 19 1140, tone 20 1141, tone 21 1142, tone 22 1143, tone 23 1144, tone 24 1145, tone 25 1146, tone 26 1147, tone 27 1148, tone 28 1149, tone 29 1150, tone 30 1151, tone 31 1152.) The 32 tones are divided into seven tone subsets: tone sub-set 0 1161 (tones 0-4), tone sub-set 1 1162 (tones 4-7), tone sub-set 2 1163 (tones 8-11), tone sub-set 3 1164 (tones 12-15), tone sub-set 4 1165 (tones 16-19), tone sub-set 5 1166 (tones 20-23), tone sub-set 6 (tones 24-27), and tone sub-set 7 (tones 28-31).

In a given first paging message signal, one particular tone sub-set is transmitted while the tones in the 7 other tone sub-sets are not transmitted. This choice among the selection of 8 tone subsets conveys information bits (e.g., 3 first paging information bits). Each tone subset in FIG. 11 is arranged so that the tones of the tone sub-set are physically contiguous tones. Then, by assuming that the wireless channel response does not vary too much from one tone to another physically contiguous tone, one can transmit additional information (e.g., 2 first paging information bits) by modulating information on the tones of any one tone subset. For example a differential modulation scheme or an orthogonal modulation scheme can be used in the contiguous tones of any tone subset. FIG. 11 assumes that an orthogonal phase modulation scheme is used on the selected tone subset. The orthogonal phase modulation scheme of FIG. 11 allows four possibilities for phase among the 4 contiguous tones of the selected (power transmission) tone sub-set: ++++, ++−−, +−+−, and +−−+, where + indicates 0 degrees phase and − indicates 180 degrees phase. Four examples of first paging message signals are shown in FIG. 11. In exemplary first paging signal 1101, transmission power is applied to the four tones of first tone sub-set 0 1161 and not applied to the other 28 tones in the other 7 tone sub-sets; and the phase is set to ++++ for the four tones, 1121, 1122, 1123, 1124, respectively, as indicated in corresponding boxes 1171, 1172, 1173, 1174. In exemplary first paging signal 1103, transmission power is applied to the four tones of first tone sub-set 0 1161 and not applied to the other 28 tones in the other 7 tone sub-sets; and the phase is set to ++−− for the four tones, 1121, 1122, 1123, 1124, respectively, as indicated in corresponding boxes 1175, 1176, 1177, 1178. In exemplary first paging signal 1105, transmission power is applied to the four tones of first tone sub-set 0 1161 and not applied to the other 28 tones in the other 7 tone sub-sets; and the phase is set to +−+− for the four tones, 1121, 1122, 1123, 1124, respectively, as indicated in corresponding boxes 1179, 1180, 1181, 1182. In exemplary first paging signal 1107, power is applied to first tone sub-set 0 1161 and not applied to the other 28 tones in the other 7 tone sub-sets; and the phase is set to +−−+ for the four tones, 1121, 1122, 1123, 1124, respectively, as indicated in corresponding boxes 1183, 1184, 1185, 1186. WTs 300 receiving the first paging signal do not need to establish a channel estimate, have knowledge of channel estimation, or rely on a history of channel conditions. The WTs 300 can wake-up at the appropriate times, receive first paging message signals for one OFDM symbol period (e.g., time interval 1104), perform an FFT, determine the tone sub-set of much higher power than the other tone sub-sets (obtaining 3 first paging message information bits), determine the phase for the four tones in the set, and make a best determination of which of the 4 code words has been transmitted (obtaining 2 additional first paging information bits).

Figure 12:
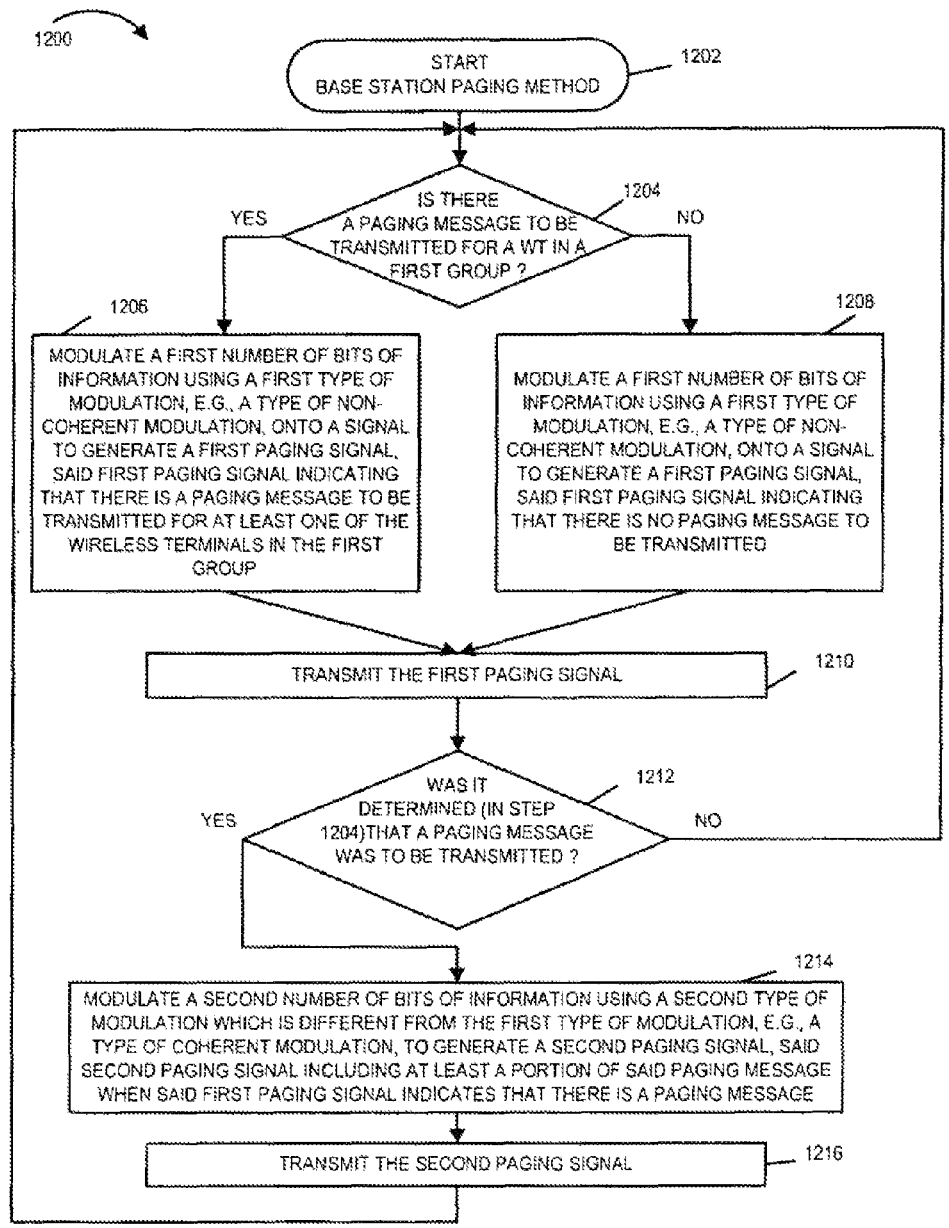
FIG. 12 illustrates an exemplary method of operating a base station and generating paging signals in accordance with the present invention.

FIG. 12 is a drawing of a flowchart 1200 illustrating an exemplary method of operating a base station to page a wireless terminal (WT) in a communications system including multiple wireless terminals in accordance with the present invention. The exemplary base station paging method starts in step 1202 where at least one base station is initialized, e.g., initialized to operate on a predetermined timing sequence regarding the transmission of paging signals and initialized to receive and/or generate paging messages to be transmitted. Operation proceeds from step 1202 to step 1204.

In step 1204, the base station determines whether or not there is a paging message to be transmitted for a WT in a first group. For example, a paging message may have been queued for transmission. Such a paging message may be generated in response to a peer node of the WT to be paged attempting to establish a communications session with the WT to be paged. The base station where the page is queued may be the last known attachment point of the WT to be paged. If there is a paging message to be transmitted for a WT in the first group, operation proceeds to step 1206; otherwise, operation proceeds to step 1208.

In step 1206, the base station is operated to modulate a first number of bits of information, e.g., one bit of information, using a first type of modulation, e.g., a type of non-coherent modulation, to generate a first paging signal conveying said first number of bits of information, said first paging signal including information indicating if there is a paging message for at least one of the wireless terminals in the first group. Some types of non-coherent modulation schemes which may be used in various embodiments include: on/off modulation, orthogonal modulation, and differential modulation. Operation proceeds from step 1206 to step 1210.

In step 1208, the base station is operated to modulate a first number of bits of information, e.g., one bit of information, using a first type of modulation, e.g., a type of non-coherent modulation, to generate a first paging signal conveying said first number of bits of information, said first paging signal including information indicating if there is no paging message to be transmitted. Some types of non-coherent modulation schemes which may be used in various embodiments include: on/off modulation, orthogonal modulation, and differential modulation. Operation proceeds from step 1208 to step 1210.

Next, in step 1210, the base station is operated to transmit the first paging signal, e.g., into its communications coverage area, e.g., cell or sector. In some OFDM embodiments, the first paging symbol is transmitted in a time period which is less than 4 symbol times in duration, e.g., in one, two or three symbol times, where a symbol time corresponds to the time period used to transmit a symbol. Multiple symbols may be transmitted in parallel during a symbol time, e.g., using different tones. The transmitting of the first paging signal may include transmitting the first paging signal into a communication channel. As discussed above, the first modulation method is a modulation method, e.g., a non-coherent modulation method, which does not require communications channel information to be used by the WTs to demodulate the modulated information.

Operation proceeds from step 1210 to step 1212. In step 1212, a check is performed as to whether step 1204 indicated that a paging message was to be transmitted. If it was determined in step 1204 that a paging message was to be transmitted, then operation proceeds to step 1214; otherwise, there is no paging message to be transmitted and operation returns to step 1204.

In step 1214, the base station is operated to modulate a second number of bits of information using a second type of modulation which is different from the first type of modulation, to generate a second paging signal, said second paging signal including, at least a portion of said paging message, when said first paging signal indicates that there is a paging message. In many embodiments, the second number of information bits is different than the first number of information bits, and the second number of information bits is greater than the first number of information bits. Some types of coherent modulation schemes which may be used in various embodiments include: quadrature phase shift keying and quadrature amplitude modulation. The second paging signal may, in some embodiments, include information used to identify a WT in the system. In some embodiments, the second paging signal includes information that can uniquely identify a WT within a group of WTs. In some embodiments, wherein the first paging signal indicates a group of communications devices, the second paging signal indicates which particular paging device in the group the paging message is directed to.

Operation proceeds from step 1214 to step 1216, where the base station is operated to transmit the second paging signal, e.g., into its communications coverage area, e.g., its cell or sector. In many embodiments, the second type of modulation, e.g., a coherent modulation method, requires the use of communications channel information by the WTs to demodulate the information modulated with the second type of modulation. In various embodiments where the first and second paging signals are transmitted at different points in time, the second paging information signal is transmitted at a first fixed time offset from the transmission time of the first paging information signal. In various OFDM embodiments, the second paging signal is transmitted at least two symbol times after completion of the transmission of the first paging signal.

Operation proceeds from step 1216 back to step 1204, where the BS again checks to see if there is a paging message to be transmitted to a WT in a first group.

In some embodiments, multiple WT paging groups exist and some of the WT groups are multicast groups including a plurality of WTs. The check of step 1204 may be extended to each of the paging groups. The first paging signal may indicate that there are no paging messages for any WTs in a first group of WTs, but that there is a paging message for at least one WT in a second group of WTs. In some embodiments, the first paging signal may indicate which of the paging groups have a member that is to receive a paging message, and multiple second paging signals may exist, e.g., one corresponding to each second paging group with a member that is to receive a page.

In various embodiments, where the first paging signal indicates a group of communications devices, multiple second paging signals may be generated, each message corresponding to a different WT in the indicated group. In such embodiments, the second paging signals may be transmitted at different fixed times with respect to the first paging signal with the offset depending on the group member to which the message to be transmitted corresponds.

Figure 13:
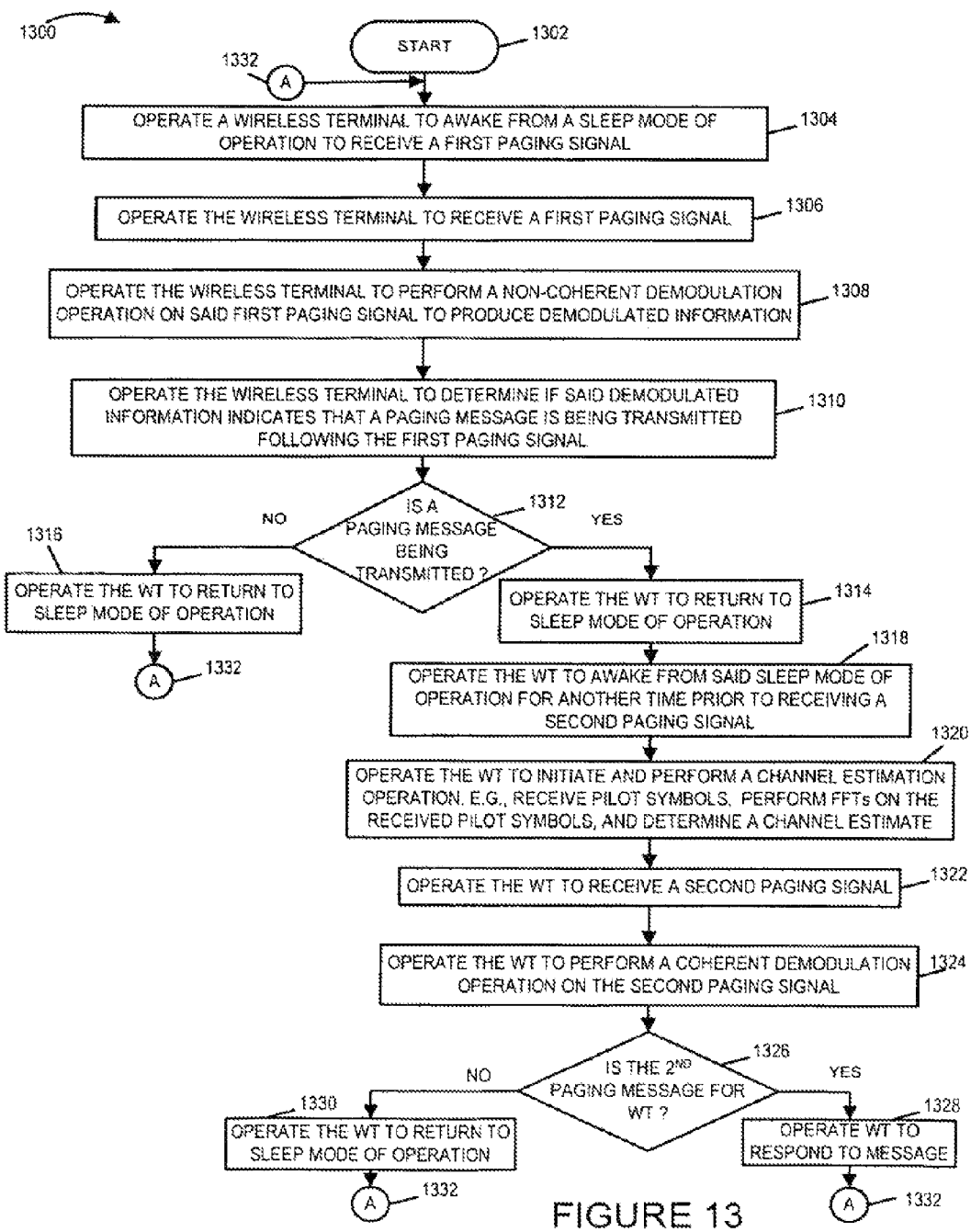
FIG. 13 illustrates an exemplary method of operating a wireless terminal to receive and process paging signals in accordance with the present invention.

FIG. 13 is a drawing of a flowchart 1300 illustrating an exemplary method of operating a wireless terminal to receive and process paging signals in accordance with the present invention. Operation starts in step 1302 where an exemplary WT is in a sleep mode of operation. Sleep mode, a lower WT power consumption state than the active mode, may allow the WT to retain some timing information and occasionally, e.g., periodically, awake to check if it is being paged. Operation proceeds to step 1304, where the WT is operated to awake from a sleep mode of operation and receive a first paging signal. Internal retained time information, used to maintain timing synchronization with the BS, and tracking of time within the WT allows the WT to determine when it should awake and expect the transmission from a BS of a first type paging signal.

Next, in step 1306, the WT is operated to receive a first paging signal. In some OFDM embodiments, the first paging signal has a duration of less than 4 symbol times. In some OFDM embodiments, the first paging signal is one or two OFDM symbols. Next, in step 1308, the WT is operated to perform a non-coherent demodulation operation on the received first paging signal producing demodulated information. This non-coherent demodulation operation does not require, and normally does not use, channel estimation information. Operation proceeds from step 1308 to step 1310. In step 1310, the WT is operated to determine if said demodulated information indicates that a paging message is being transmitted following the first paging signal. Next, in step 1312, operation proceeds to step 1316 if a paging message is being transmitted, while operation proceeds to step 1314 if a paging message is not being transmitted.

In step 1316, the WT is operated to return to sleep mode and then operation proceeds via connecting node A 1332 back to step 1304, where the WT is again awoken at the appropriate time for the next first paging signal.

In step 1314, the WT is operated to return, e.g., briefly, to the sleep mode of operation. Operation proceeds from step 1314 to step 1318, where the wireless terminal is awoken from the sleep mode of operation for another time prior to receiving a second paging signal. The WT is awoken sufficiently in advance of the expected second paging signal to allow for the completion of a channel estimate. Then in step 1320, the WT is operated to initiate and perform a channel estimation operation. The channel estimation operation may include, e.g., receiving pilot symbols and performing FFTs on the received pilot symbols, e.g., 10-20 pilot symbols, and then determining a channel estimate from the processed information. Next, in step 1322, the WT is operated to receive a second paging signal, e.g., a paging signal including at least 10 symbols.

Then, in step 1324 the WT performs a coherent demodulation operation on the second paging signal using the channel estimation information obtained in step 1320. The second paging signal includes a second number of information bits, while the first paging signal includes a first number of paging bits. The first and the second number of information bits may be the same. However, in many embodiments, the second number of paging bits is greater than the first number of paging bits. In some embodiments, the demodulated second paging information includes a portion of a WT identifier and/or a portion of a paging message. In some embodiments, the WT identifier is all or a portion of the paging message. In some embodiments, the paging message includes mobile node information, an instruction or additional information other than simply mobile node identification information.

In step 1326, a decision is performed, based on the decoded information of the second paging message, either alone or in combination with information from the decoded first paging message, whether or not the page was intended for the WT. For example the first paging signal may have identified a group of WTs and the second paging information identified the specific or unique WT to which the page message is directed. The information obtained from demodulating the second paging signal may, in some embodiments, includes a portion of a WT identifier, and the operation of step 1326 includes determining from at least a portion of a WT identifier if the page is directed to the WT. In some embodiments, the portion of the WT identifier provided in the second paging message in combination with the group identifier of the first paging message information uniquely identifies the WT in the communications system to which the paging message is transmitted.

If in step 1326, it is determined that the page not directed to the WT, then operation proceeds to step 1330, where the WT is operated to return to the sleep mode of operation. However, if in step 1326, the WT determines that it is the intended recipient of the page message, then operation proceeds to step 1328, where the WT responds to the page. Such a response may include, e.g., acknowledging that the page has been received, establishing and participating in a communications session with a peer node, and eventually transitioning back to sleep mode.

From either step 1330 or step 1328, operation proceeds via connecting node A 1332 back to step 1304, where the WT awakes for another first paging message at the appropriate time.

In some embodiments, the system supports a maximum number of WTs which can be registered to receive pages in said system at a point in time, and the first number of information bits communicated in first paging signals is less than the number of bits required to uniquely each of the said maximum number of WTs. In such embodiments, information included in the first paging message in combination with information in the second paging message can uniquely identify a WT in the system.

While described primarily in the context of an OFDM system, the methods and apparatus of the present invention are applicable to a wide range of communications systems including many non-OFDM and/or non-cellular systems.

In various embodiments nodes described herein are implemented using one or more modules to perform the steps corresponding to one or more methods of the present invention, for example, paging modules modulation modules, paging signal detection modules, demodulation modules, communications modules, timing modules, etc. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

The invention claimed is:

1. A method of paging a wireless terminal in a communications system including multiple wireless terminals, the method comprising:
   modulating, using a non-coherent type of modulation, a first number of bits of information to generate a first paging signal, said first paging signal conveying said first number of bits of information, said first paging signal including information indicating whether there is a paging message and indicating a wireless terminal group;
   modulating, using a coherent type of modulation, a second number of bits of information to generate a second paging signal, said second paging signal including, when there is the paging message, at least a portion of said paging message where said first paging signal indicates that there is the paging message and indicates a particular wireless terminal within the wireless terminal group to which the page is directed;
   transmitting said first paging signal; and
   transmitting said second paging signal.

2. The method of claim 1 in which the wireless terminal group is one of a plurality of wireless terminal groups, some of the plurality of wireless terminal groups being multicast groups including a plurality of wireless terminals.

3. The method of claim 1 in which the first and second paging signals are transmitted at different points in time, the second paging signal being transmitted at a first fixed time offset from the time the first paging signal is transmitted.

4. The method of claim 1 in which:
   the communications system supports a maximum number of wireless terminals which can be registered to receive pages in the communication system at a point in time; and
   the first number of bits is less than a number of bits required to uniquely identify each of the maximum number of wireless terminals.

5. The method of claim 1, in which the first paging signal further indicates that there is no paging message for wireless terminals in a second wireless terminal group.

6. An apparatus for communicating with wireless terminals in a communications system, the system comprising:
   means for modulating, using a non-coherent type of modulation, a first number of bits of information to generate a first paging signal, the first paging signal conveying the first number of bits of information, the first paging signal including information indicating whether there is a paging message and indicating a wireless terminal group;

means for modulating, using a coherent type of modulation, a second number of bits of information to generate a second paging signal, the second paging signal including, when there is the paging message, at least a portion of the paging message where the first paging signal indicates that there is the paging message and indicates a particular wireless terminal within the wireless terminal group to which the page is directed;

means for transmitting the first paging signal; and means for transmitting the second paging signal.

7. The apparatus of claim 6 in which the wireless terminal group is one of a plurality of wireless terminal groups, some of the plurality of wireless terminal groups being multicast groups including a plurality of wireless terminals.

8. The aparatus of claim 6 in which the first and second paging signals are transmitted at different points in time, the second paging signal being transmitted at a first fixed time offset from the time the first paging signal is transmitted.

9. The apparatus of claim 6 in which:

the communications system supports a maximum number of wireless terminals which can be registered to receive pages in the communication system at a point in time; and the first number of bits is less than a number of bits required to uniquely identify each of the maximum number of wireless terminals.

10. The apparatus of claim 6, in which the first paging signal further indicates that there is no paging message for wireless terminals in a second wireless terminal group.

11. A non-transitory machine readable medium having program code recorded thereon, the program code comprising:

program code to modulate, using a non-coherent type of modulation, a first number of bits of information to generate a first paging signal, the first paging signal conveying the first number of bits of information, the first paging signal including information indicating whether there is a paging message and indicating a wireless terminal group;

program code to modulate, using a coherent type of modulation, a second number of bits of information to generate a second paging signal, the second paging signal including, when there is the paging message, at least a portion of the paging message where the first paging signal indicates that there is the paging message and indicates a particular wireless terminal within the wireless terminal group to which the page is directed;

program code to transmit the first paging signal; and program code to transmit the second paging signal.

12. The non-transitory machine readable medium of claim 11 in which the wireless terminal group is one of a plurality of wireless terminal groups, some of the plurality of wireless terminal groups being multicast groups including a plurality of wireless terminals.

13. The non-transitory machine readable medium of claim 11 in which the first and second paging signals are transmitted at different points in time, the second paging signal being transmitted at a first fixed time offset from the time the first paging signal is transmitted.

14. The non-transitory machine readable medium of claim 11 in which:

the communications system supports a maximum number of wireless terminals which can be registered to receive pages in the communication system at a point in time; and the first number of bits is less than a number of bits required to uniquely identify each of the maximum number of wireless terminals.

15. The non-transitory machine readable medium of claim 11, in which the first paging signal further indicates that there is no paging message for wireless terminals in a second wireless terminal group.

16. An apparatus configured for communicating with wireless terminals in a communications system, the apparatus comprising:

at least one processor; and a memory coupled to the at least one processor, the at least one processor being configured:

to modulate, using a non-coherent type of modulation, a first number of bits of information to generate a first paging signal, the first paging signal conveying the first number of bits of information, the first paging signal including information indicating whether there is a paging message and indicating a wireless terminal group;

to modulate, using a coherent type of modulation, a second number of bits of information to generate a second paging signal, the second paging signal including, when there is the paging message, at least a portion of the paging message where the first paging signal indicates that there is the paging message and indicates a particular wireless terminal within the wireless terminal group to which the page is directed;

to transmit the first paging signal; and to transmit the second paging signal.

17. The apparatus of claim 16 in which the wireless terminal group is one of a plurality of wireless terminal groups, some of the plurality of wireless terminal groups being multicast groups including a plurality of wireless terminals.

18. The apparatus of claim 16 in which the first and second paging signals are transmitted at different points in time, the second paging signal being transmitted at a first fixed time offset from the time the first paging signal is transmitted.

19. The apparatus of claim 16 in which:

the communications system supports a maximum number of wireless terminals which can be registered to receive pages in the communication system at a point in time; and the first number of bits is less than a number of bits required to uniquely identify each of the maximum number of wireless terminals.

20. The apparatus of claim 16, wherein the first paging signal further indicates that there is no paging message for wireless terminals in a second wireless terminal group.

* * * * *